US009448465B2

(12) United States Patent
Ramirez

(10) Patent No.: US 9,448,465 B2
(45) Date of Patent: Sep. 20, 2016

(54) PROJECTION SCREEN WITH GOLD COATED PROJECTION RECEIVING SURFACE

(71) Applicant: Joseph Luis Ramirez, Bethesda, MD (US)

(72) Inventor: Joseph Luis Ramirez, Bethesda, MD (US)

(*) Notice: Subject to any disclaimer, the term of this patent is extended or adjusted under 35 U.S.C. 154(b) by 0 days.

(21) Appl. No.: 14/371,839

(22) PCT Filed: Jan. 10, 2013

(86) PCT No.: PCT/US2013/021011
§ 371 (c)(1),
(2) Date: Jul. 11, 2014

(87) PCT Pub. No.: WO2013/106555
PCT Pub. Date: Jul. 18, 2013

(65) Prior Publication Data
US 2014/0355112 A1  Dec. 4, 2014

Related U.S. Application Data

(60) Provisional application No. 61/631,786, filed on Jan. 11, 2012.

(51) Int. Cl.
*G03B 21/60* (2014.01)
*B32B 37/24* (2006.01)
(Continued)

(52) U.S. Cl.
CPC .............. *G03B 21/60* (2013.01); *B05D 5/063* (2013.01); *B32B 37/24* (2013.01); *G03B 21/567* (2013.01); *B32B 2037/243* (2013.01)

(58) Field of Classification Search
CPC .... G03B 21/56; G03B 21/60; G03B 21/567; B05D 5/00; B05D 5/061; B05D 5/063; B05D 5/067
USPC .......... 359/443, 449, 459; 427/402, 412, 11, 427/62
See application file for complete search history.

(56) References Cited

U.S. PATENT DOCUMENTS 1,506,729 A * 8/1924 Pearl ..................... G03B 21/56
250/329
2,491,018 A * 12/1949 Richard ................. G03B 33/00
352/45

(Continued)

FOREIGN PATENT DOCUMENTS

JP 2007-003761 A 1/2007
JP 2009-258285 A 11/2009

OTHER PUBLICATIONS

Perry Kurt et al. A Primer for the Materials, Methods and Techniques of Conservation, Nov. 2010. https://web.archive.org/web/20101126142737/http://ncartmuseum.org/pdf/ conservation-primer. pdf.*

(Continued)

*Primary Examiner* — Christopher Mahoney
(74) *Attorney, Agent, or Firm* — Volpe and Koenig, P.C.

(57) ABSTRACT

A projection screen has a gold coated projection receiving surface that reflects light. The projection screen includes a support structure and an adhesive layer on top of the support structure. A fiber support is adhered to the support structure using the adhesive layer. A chalk and adhesive layer is applied on to the fiber support and a clay and adhesive layer is applied on to chalk and adhesive layer. A gold layer is applied to the clay and adhesive layer. A light or a portion thereof passes through each of the multiple ordered layers, including the gold layer, the clay and adhesive layer, the chalk and adhesive layer and reflects back a lustrous, iridescent image that has motion and depth qualities with transmuted color characteristics.

19 Claims, 20 Drawing Sheets

(51) Int. Cl.
  *G03B 21/56* (2006.01)
  *B05D 5/06* (2006.01)

(56) References Cited

U.S. PATENT DOCUMENTS

| | | | | |
|---|---|---|---|---|
| 3,557,470 | A * | 1/1971 | Emerick | G09B 9/32 352/131 |
| 5,361,163 | A * | 11/1994 | Matsuda | G03B 21/60 264/1.9 |
| 5,456,967 | A | 10/1995 | Nezu | |
| 5,502,481 | A * | 3/1996 | Dentinger | G02B 27/0093 348/51 |
| 2003/0035917 | A1* | 2/2003 | Hyman | B41M 1/30 428/67 |
| 2004/0212546 | A1* | 10/2004 | Dixon | H04N 9/3182 345/1.1 |
| 2006/0066803 | A1 | 3/2006 | Aylward et al. | |
| 2006/0228523 | A1* | 10/2006 | Cronin | B44D 5/00 428/142 |
| 2007/0273967 | A1* | 11/2007 | Gypen | B32B 7/12 359/460 |
| 2009/0225416 | A1 | 9/2009 | Teather et al. | |
| 2012/0237699 | A1* | 9/2012 | Alfekri | B41M 5/506 428/32.16 |

OTHER PUBLICATIONS

Richard Walker, Water Gilding Website https://web.archive.org/web/20111109191904/http://www.watergild.com/html/water_gilding.html Nov. 2011.*

* cited by examiner

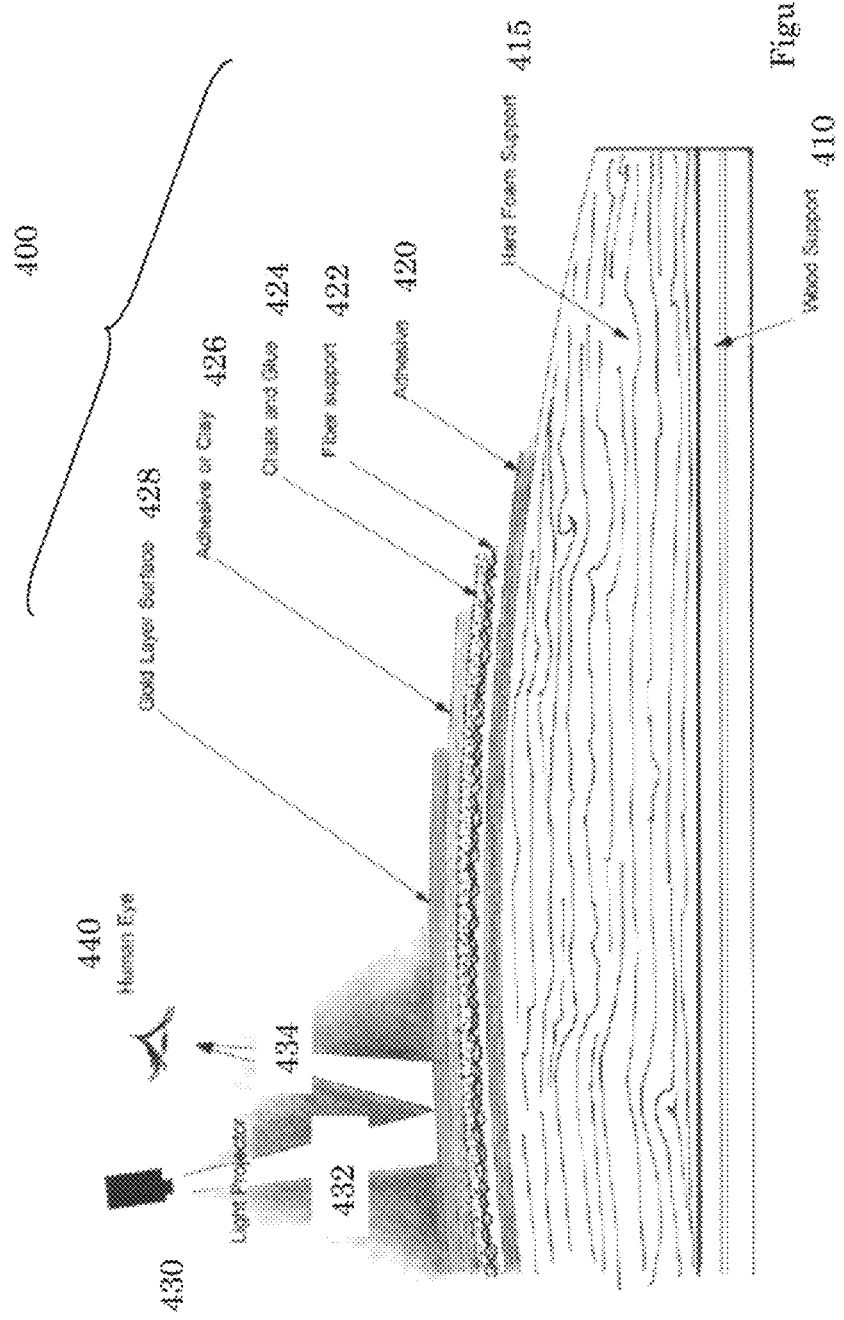

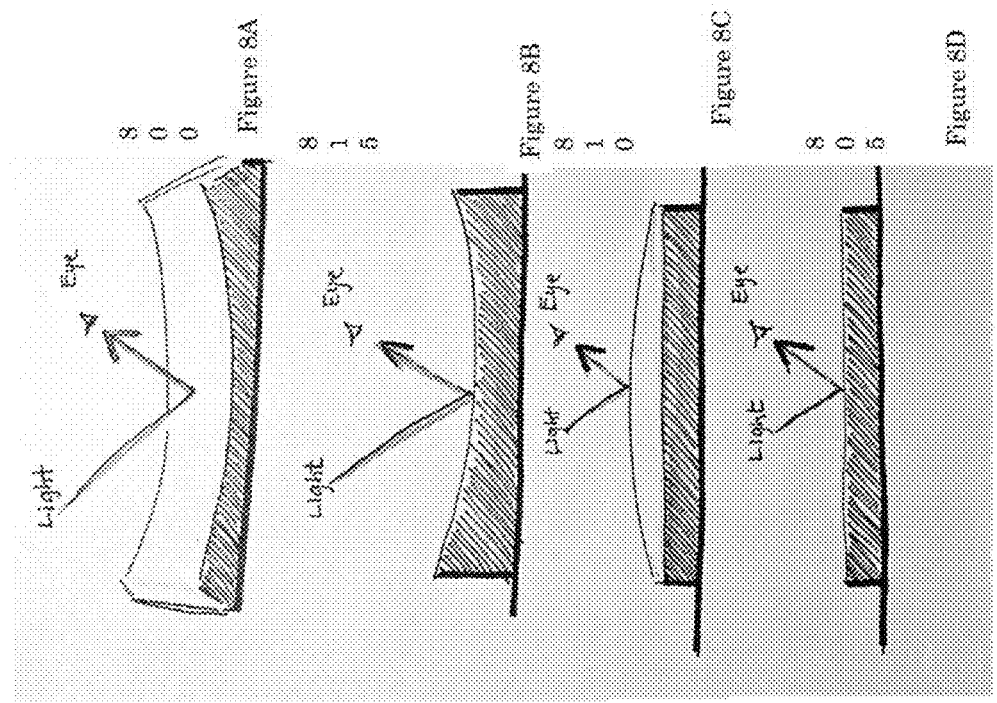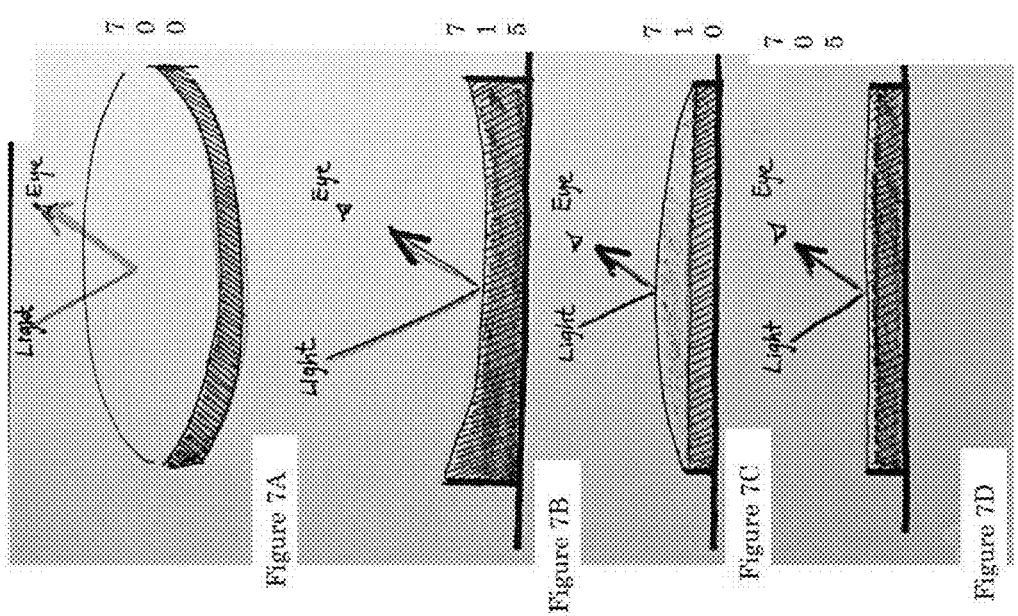

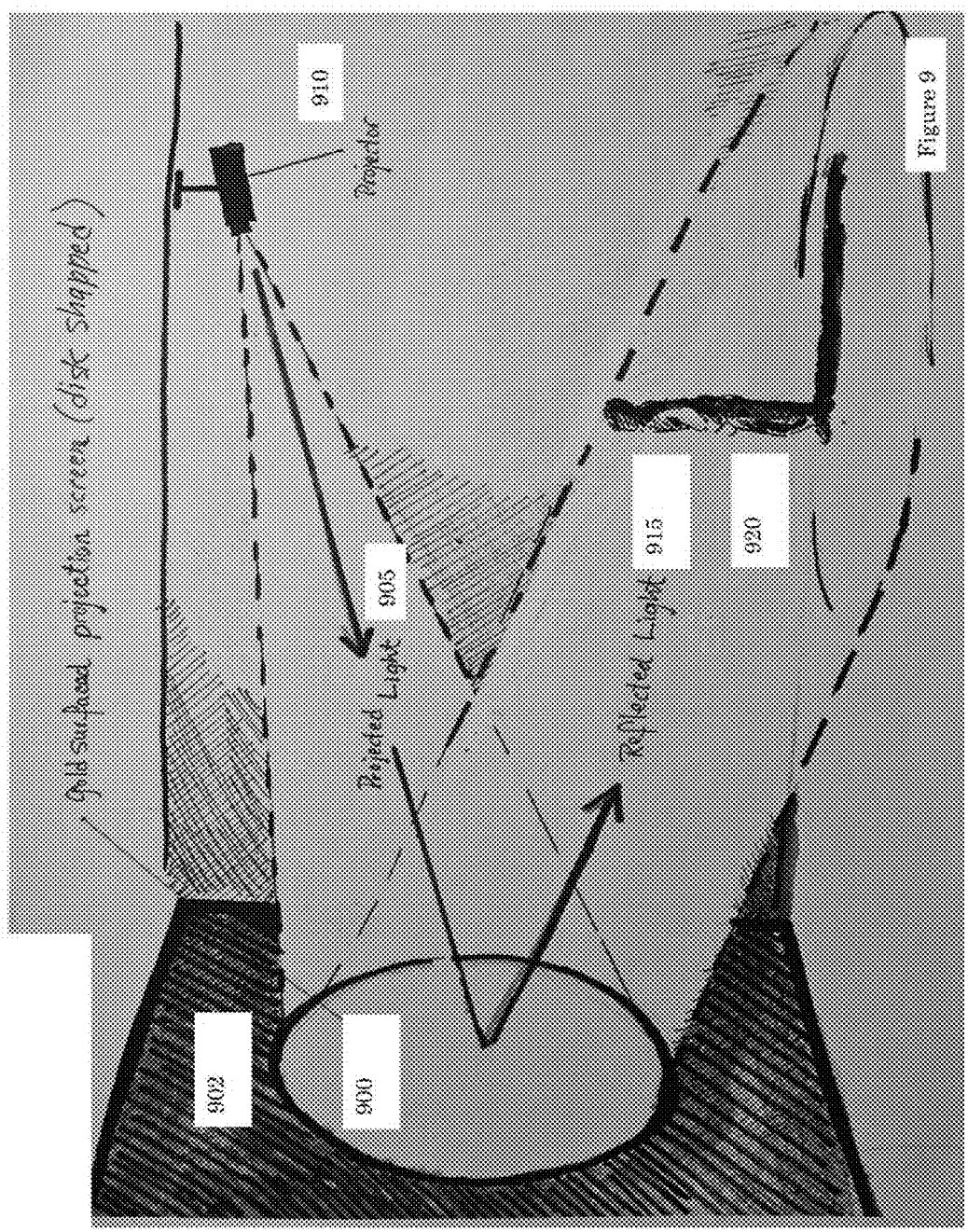

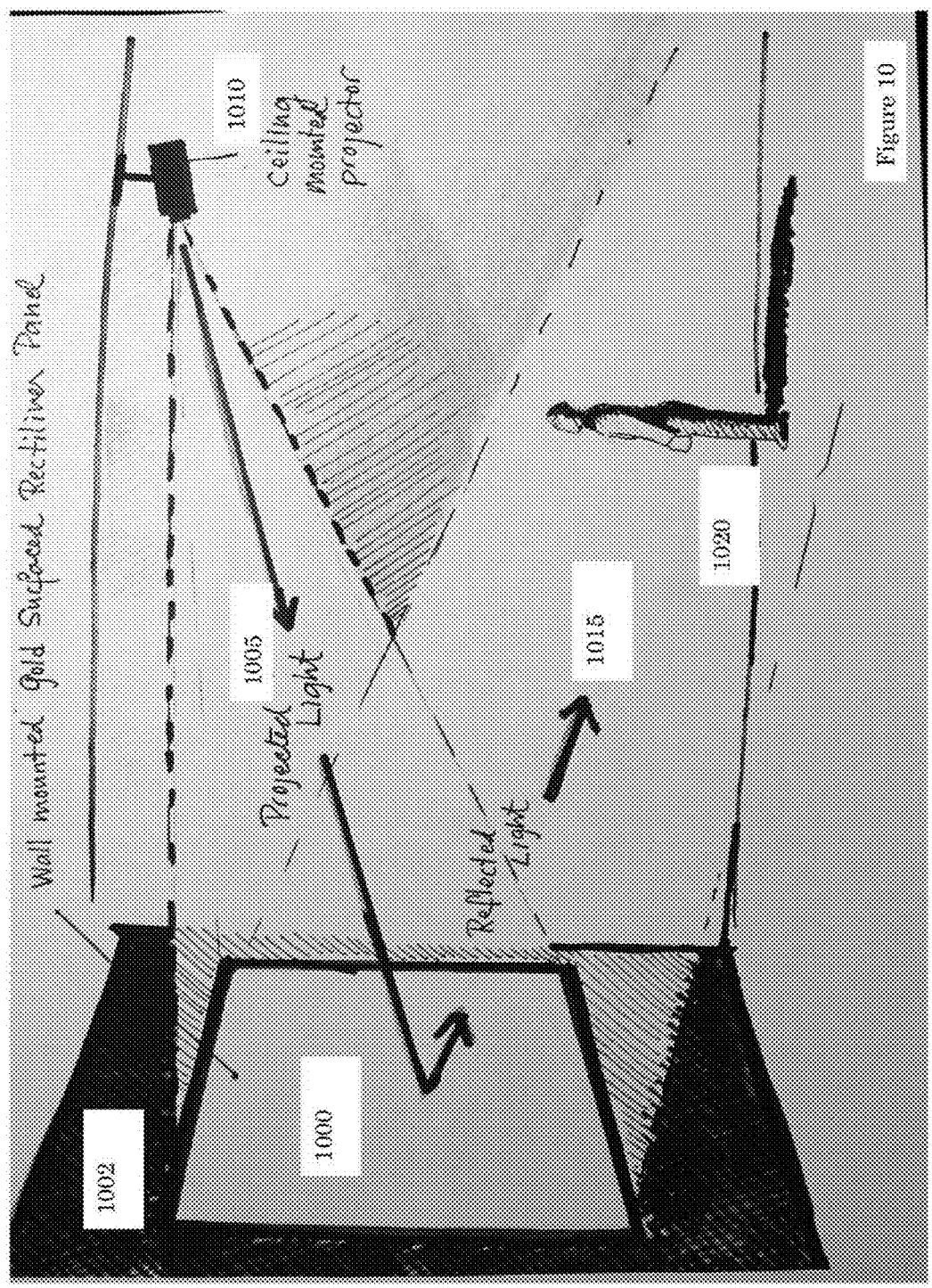

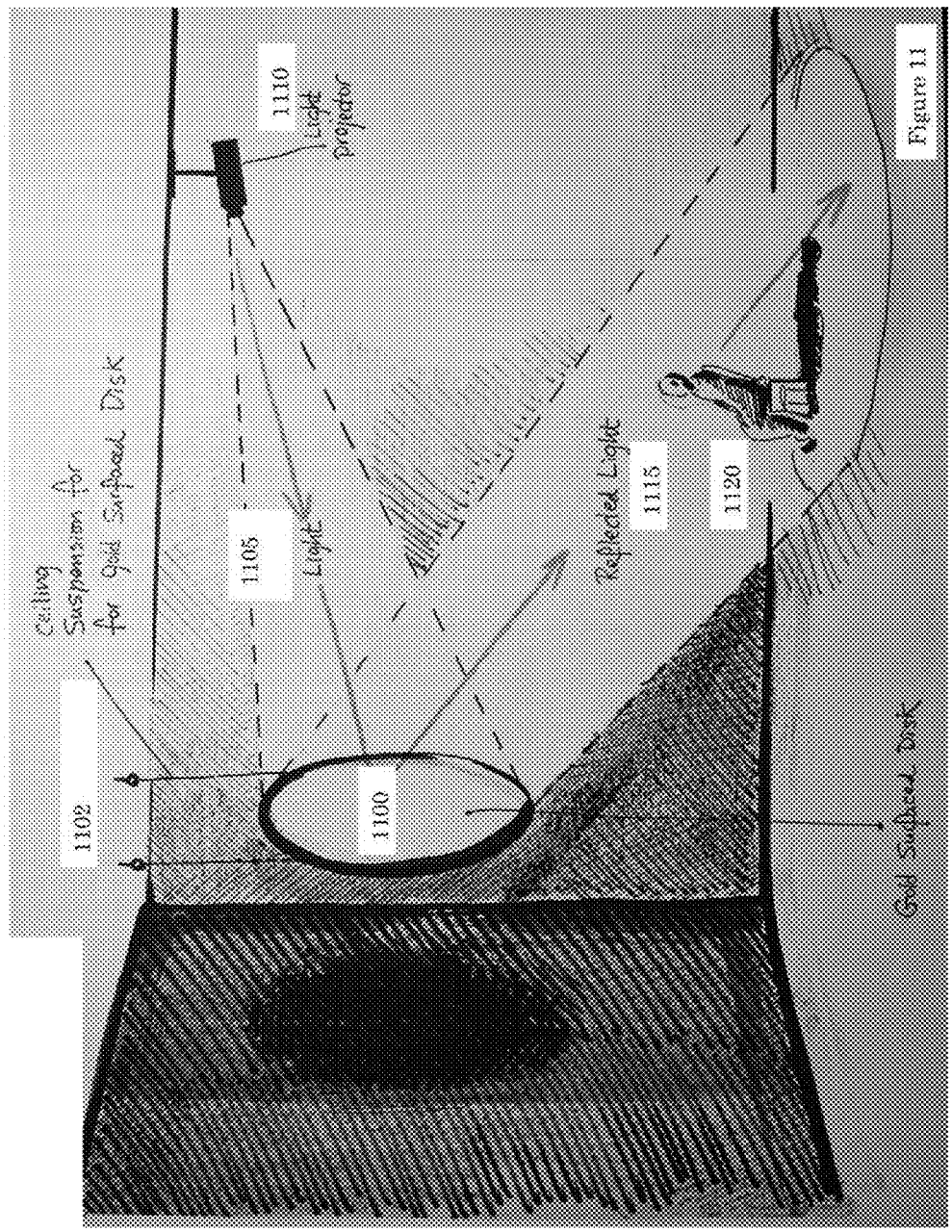

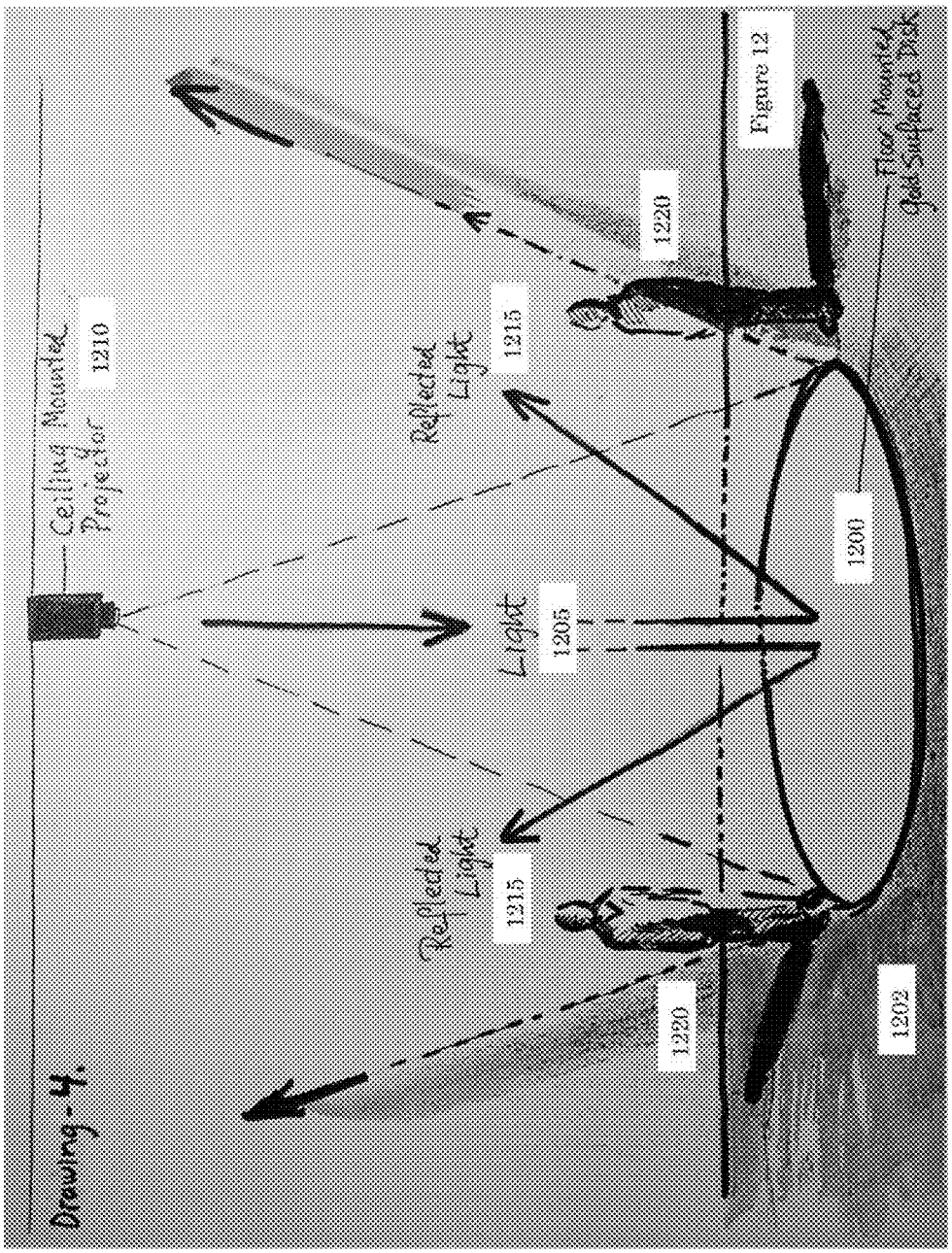

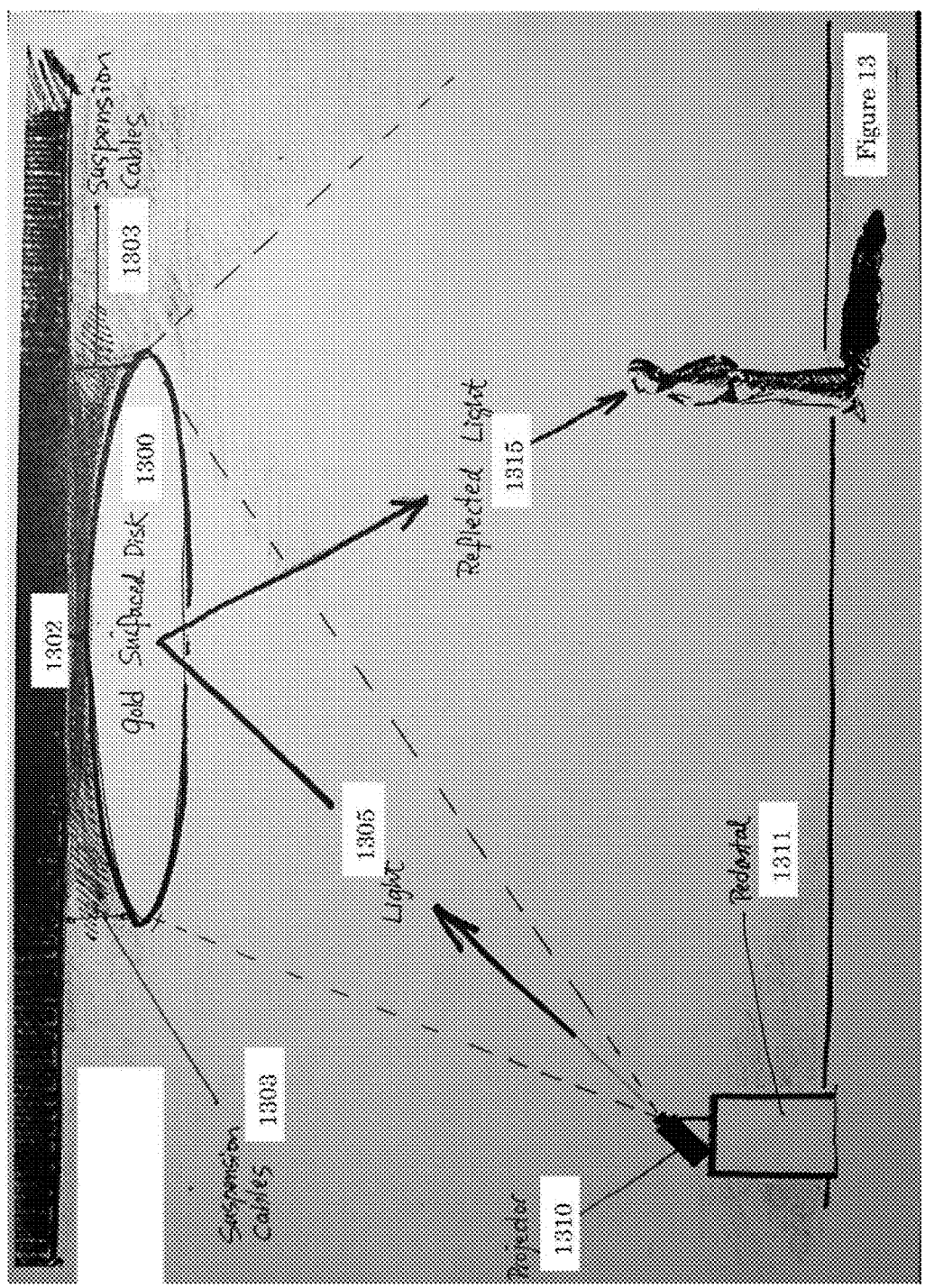

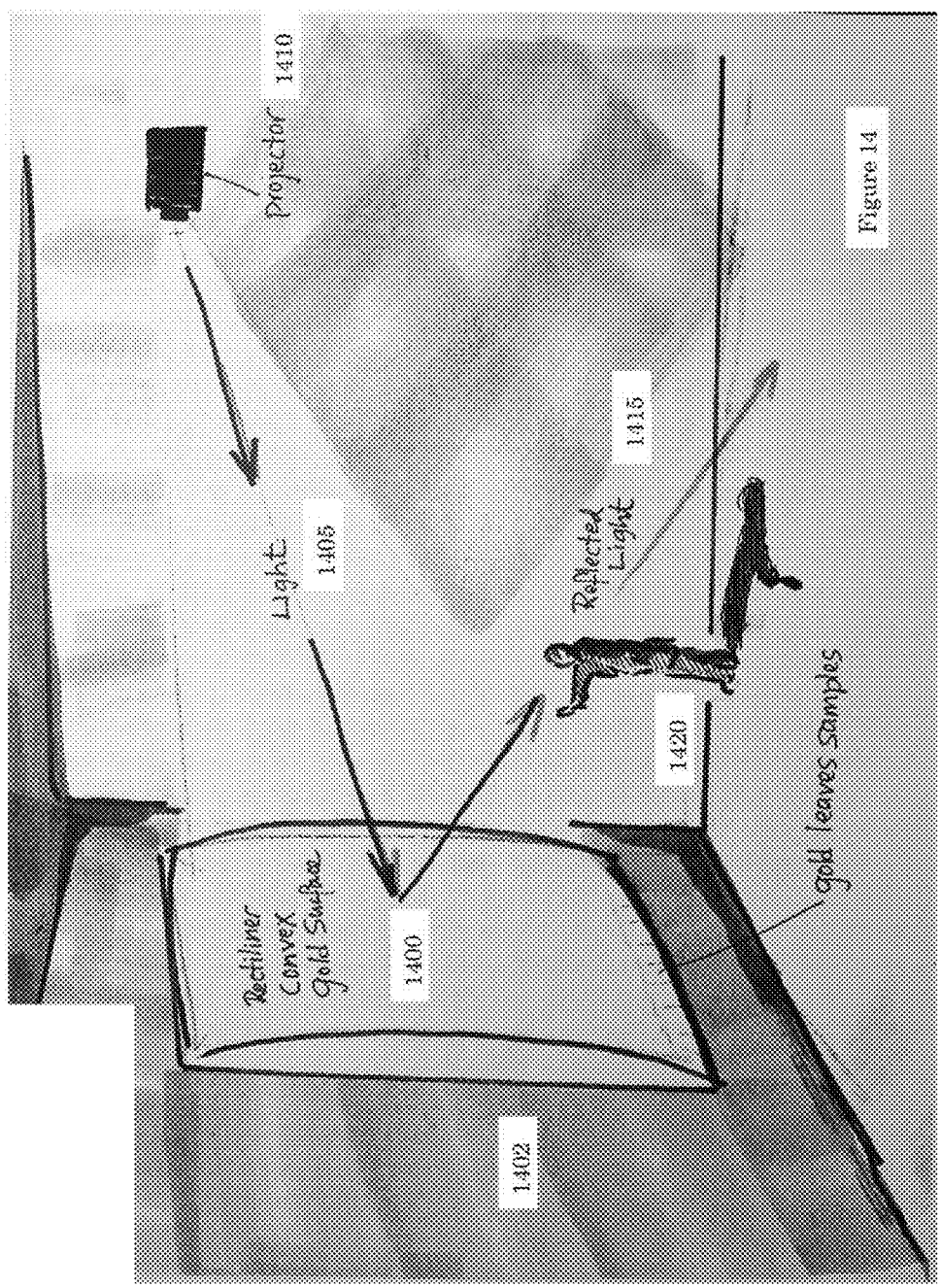

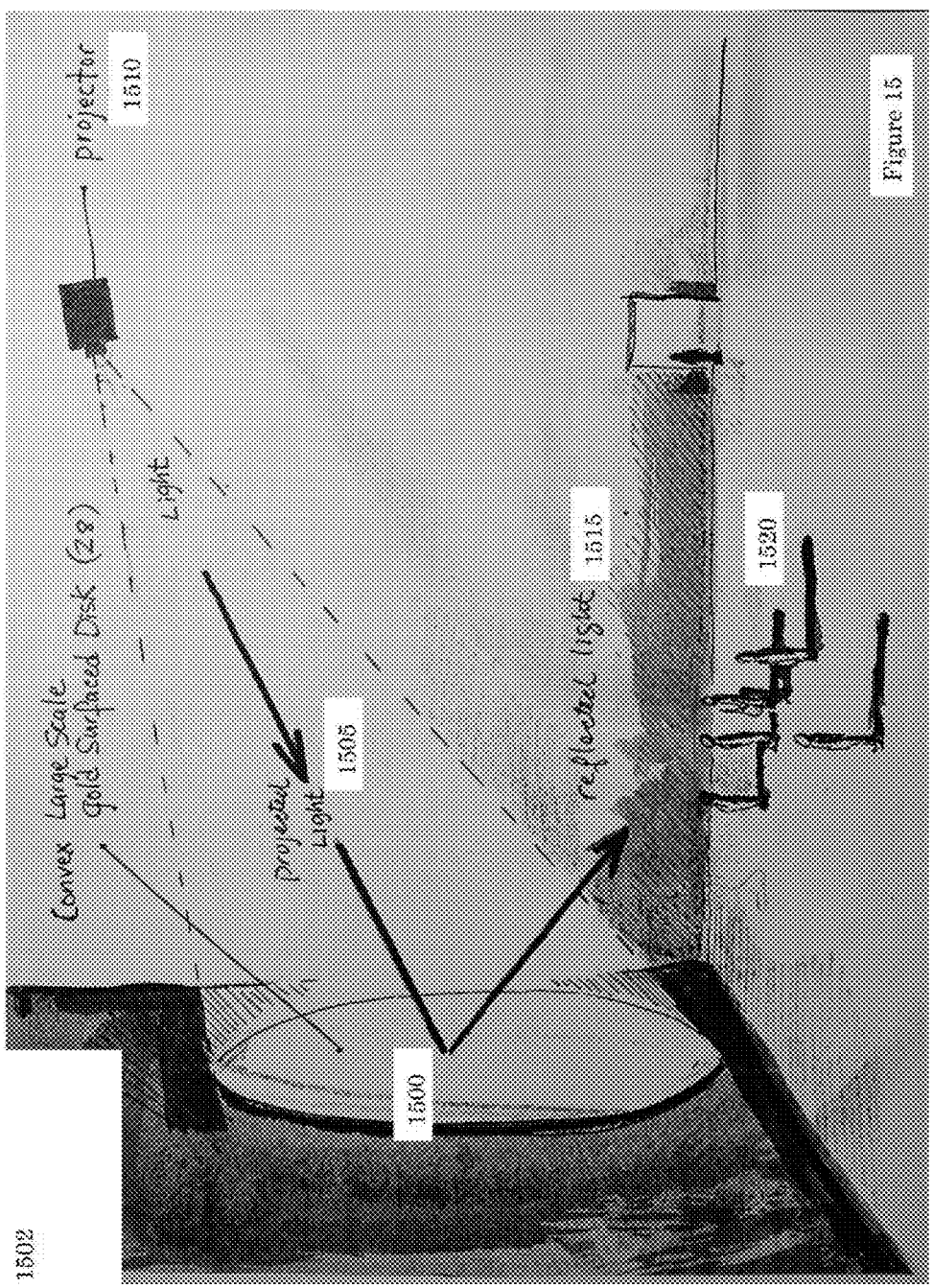

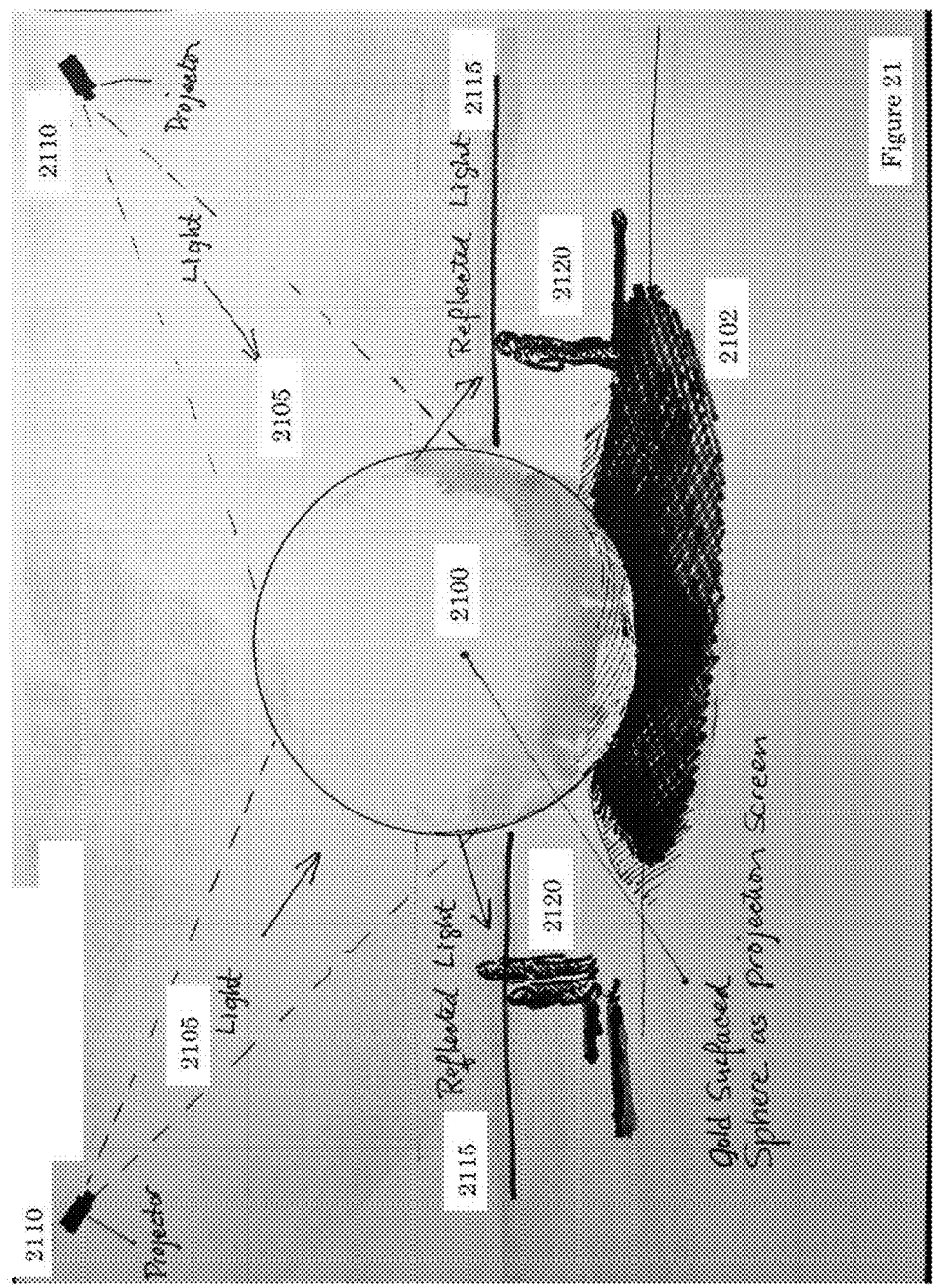

PROJECTION SCREEN WITH GOLD COATED PROJECTION RECEIVING SURFACE

CROSS REFERENCE TO RELATED APPLICATION

This application claims the benefit of U.S. Provisional Application No. 61/631,786, filed Jan. 11, 2012, and PCT Application No. PCT/US2013/021011, filed Jan. 10, 2013, the content of which are hereby incorporated by reference herein as if fully set forth herein.

FIELD OF INVENTION

This application is related to projection screens.

BACKGROUND

Standard projection screens work on one plane in front of a viewer and are generally not able to provide depth, motion and illusion to a projected image.

SUMMARY

A projection screen has a gold coated projection receiving surface that reflects light. The projection screen includes a support structure and an adhesive layer on top of the support structure. A fiber support is adhered to the support structure using the adhesive layer. A chalk and adhesive layer is applied on to the fiber support and a clay and adhesive layer is applied on to chalk and adhesive layer. A gold layer is applied to the clay and adhesive layer. A light or a portion thereof passes through each of the multiple ordered layers, including the gold layer, the clay and adhesive layer, the chalk and adhesive layer and reflects back a lustrous, iridescent image that has motion and depth qualities with transmuted color characteristics.

BRIEF DESCRIPTION OF THE DRAWINGS

A more detailed understanding may be had from the following description, given by way of example in conjunction with the accompanying drawings wherein:

FIG. 4 is another embodiment of a projection screen with metallic coated projection receiving surface;

FIGS. 7A-7D show an embodiment of a circular projection screen with metallic coated projection receiving surface with different surface topologies;

FIGS. 8A-8D show an embodiment of a rectilinear projection screen with metallic coated projection receiving surface with different surface topologies;

FIG. 9 shows an embodiment of a disk shaped projection screen with metallic coated projection receiving surface in a wall mounted configuration;

FIG. 10 shows an embodiment of a rectilinear projection screen with metallic coated projection receiving surface in a wall mounted configuration;

FIG. 11 shows an embodiment of a disk shaped projection screen with metallic coated projection receiving surface in a vertical suspended configuration;

FIG. 12 shows an embodiment of a disk shaped projection screen with metallic coated projection receiving surface in a floor mounted configuration;

FIG. 13 shows an embodiment of a disk shaped projection screen with metallic coated projection receiving surface in a horizontal suspended configuration;

FIG. 14 shows an embodiment of a rectilinear projection screen with convex metallic coated projection receiving surface in a wall mounted configuration;

FIG. 15 shows an embodiment of a large scale disk shaped projection screen with convex metallic coated projection receiving surface in a wall mounted configuration;

FIG. 21 shows an embodiment of a sphere shaped projection screen with metallic coated projection receiving surface in a floor mounted configuration.

DETAILED DESCRIPTION

Figure 1:
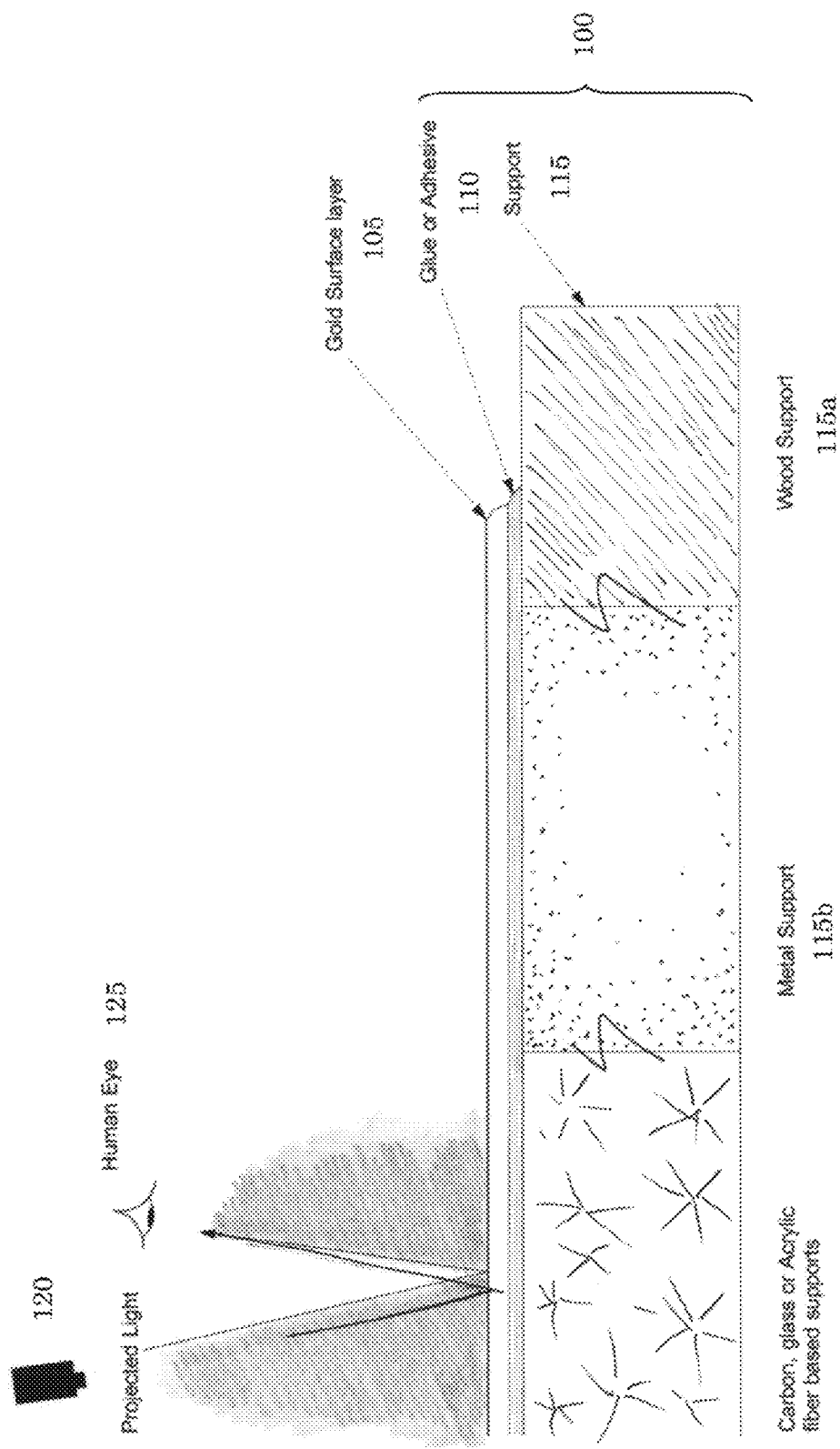
FIG. 1 is an embodiment of a projection screen with metallic coated projection receiving surface.

It is to be understood that the figures and descriptions of embodiments of the metallic coated projection receiving surface have been simplified to illustrate elements that are relevant for a clear understanding, while eliminating, for the purpose of clarity, other elements found in typical projection screens and configurations. Those of ordinary skill in the art may recognize that other elements and/or steps are desirable and/or required in implementing the metallic coated projection receiving surface. However, because such elements and steps are well known in the art, and because they do not facilitate a better understanding of the metallic coated projection receiving surface and configurations for use thereof, a discussion of such elements and steps is not provided herein.

The non-limiting embodiments described herein are with respect to metallic coated projection receiving surface and configurations for use thereof. The embodiments and variations described herein, and/or shown in the drawings, are presented by way of example only and are not limiting as to the scope and spirit. The metallic coated projection receiving surfaces may be used in a number of applications.

Although a gold coated projection receiving surface is used herein for the various embodiments, other metals may also be used as described herein and the term metallic coated projection receiving surface includes gold coated projection receiving surface and other metallic coated projection receiving surfaces.

FIG. 1 shows an embodiment of a projection screen 100 with metallic coated projection receiving surface 105. The screen 100 further includes a support 115 which may be, but is not limited to, wood 115a, metal 115b, plastic, fiberglass, carbon 115c, acrylic 115c, glass 115c, a flexible membrane or the like. The support 115 provides the foundation for an adhesive layer 110 and the metallic coated projection receiving surface 105. The adhesive layer 110 may be, but is not limited to, glue, varnish, tape and the like. In one embodiment, the adhesive layer is rabbit skin glue.

The metallic coated projection receiving surface 105 may be a layer of burnished or unburnished pure gold leaf, burnished or unburnished gold alloy, burnished or unburnished gold plating, burnished or unburnished gold powder, burnished or unburnished gold paint, burnished or unburnished pure platinum leaf, burnished or unburnished platinum alloy, burnished or unburnished platinum plating, burnished or unburnished platinum powder, burnished or unburnished platinum paint, or sprayed on gold powder or paint.

In an embodiment, the metallic coated projection receiving surface 105 may be applied in sheets of gold or platinum leaf. The thin sheets of gold or platinum leaf may come in varying degrees of purity ranging from 6 to 24 karats. Gold leaf alloys may comprise gold and platinum, silver, copper, nickel, or palladium. The gold or platinum leaf may vary in size between 10 and 120 millimeter squares or any other available sizes. The gold or platinum surface may be burnished, polished or may be left as an unfinished matte. In another embodiment, the metallic coated projection receiving surface 105 may be metals, in pure or alloy form, that may include magnesium, aluminum, tin, and lead.

In another embodiment, the metallic coated projection receiving surface 105 may be applied in a powder, in flakes or via paint.

Described herein is a method for making the projection screen 100. A shape and size for the support 115 is selected. The size of the support 115 may vary from intimate to large, i.e., 20 centimeters to movie screen size. The shape may be circular, rectangular, rectilinear and the like. The surface of the support 115 may be more or less flat but may have a convex, concave, 3-D relief or the like form. The finish on the surface of the support 115 sanded to a desired grit. In an embodiment, the grit is above 600 grit. In another embodiment, the finish is a polished grit.

The adhesive layer 110 is then applied to the surface of the support 115 in multiple layers. In an embodiment, the adhesive layer 110 is a varnish or glue. In one embodiment, the adhesive layer 110 is rabbit skin glue which works by microscopically stitching the wood fibers together. Any gaps in the joint may not be successfully filled and the mating surface must be very smooth as described herein above.

The metallic coated projection receiving surface 105 may then be created by applying, for example, gold leaves. The gold may be laid using a transfer process. For example, the gold is laid down on the semi-dry tack surface using a light substantially even pressure. The application is smooth and consistent throughout the covering of the final surface. In other embodiments, gilding may be implemented through gold plating or an application of a varnish to receive sheets of gold leaf or gold powder.

The resulting layer is a matte like finish of gold. This is highly reflective to light, non-tarnishing, and beautiful gold layer. In an embodiment, a clear sealer is applied over the final gold layer for protection. The clear sealer may be, but is not limited to, lacquer or some other transparent medium.

In the embodiments described herein, gold is a semi-transparent material. Light, for example from a projector 120, penetrates the gold layer, interacts with the under layers and then bounces back to the eye 125. The combination of the layers together makes the effect. The contents of each layer in the order described herein forms the gold or metallic screens. The layers make the projections on the gold very powerful. These ordered layers differentiate on ordinary projection from a gold screen projection. In particular, incident light interacts with the screen as the light is incident on the outermost surface. Some of the incident light is reflected by the surface, while some of the light is refracted. The light that is refracted progresses through the screen, and interacts with the subsequent layers of the screen in a similar way. That is, at each successive layer, some of the incident light is reflected by that layer and some of the incident light is refracted through to the next layer. As would be understood by those skilled in the pertinent arts, each layer may also absorb some of the incident light. The output of the reflection by the screen is the accumulation of the light that is reflected from each layer and may incorporate the interactions and properties with each layer that the light interacts with.

Moreover, the hand tooled approach to laying down the gold creates an irregular surface. For example, in the case of water gilding embodiments described herein, the hand tooling of the agate stone makes the surface tremble in the image. In an embodiment, these techniques allow for a breathing, trembling image. In another embodiment, these techniques may also allow for a stable solid image that anchors the screen with light. In addition, the choice of topology for the surface, i.e. concave, convex, flat or a combination thereof, induces the effect of a floating world.

All the colors need to be color corrected specific to the screen 100. The films or content to be projected on the screen 100 is edited as the films or content is projected on the screen 100. Each film or content is designed specifically for the screen. The resulting films are termed gold projections. Normal projection screens will not produce this effect. In this embodiment, the gold surface makes the difference.

In particular, these gold projections have an increased luminosity with respect to the projected image. The luminosity of the image is increased. The surface of the screen is so highly reflective it gives the illusion of being the source of light as opposed to a projection screen. For example, burnished gold is highly reflective. A smaller surface area is needed as compared to standard screens. The gold reflects the light back and absorbs very little of the light. The percentage of returned light is nearly double as compared to, for example, a standard white screen surface. The effect is a shimmering quality of image and the surface takes on a mercurial sense of fluidity. The light has a lustrous, iridescent quality. The chatoyant surface on the screen catches the light and returns it much like the light in an animal's eye illuminated at night. This reflection is intentional and evenly distributed across the surface.

The gold screen provides an enhanced sense of motion in the projected image. The surface takes on a quality of an animated painting. Motion and the illusion of motion in the imagery are increased intentionally. Small details tremble and when the viewer moves minor amounts, for example, 2 inches, the images are slightly altered and shifted in the viewer's eye. When the viewer moves greater amounts, for example, 8 feet, the images takes on a ghostly shift and the light source (the projector) moves in the image. The viewer enters into a dialogue with the screen.

The gold screen provides an enhanced sense of depth in the image. The depth of the projected image is enhanced. The light travels through the gold layer to the bole and gesso layers (as in the embodiments for FIGS. 2-4), and returns to the viewer. This layering gives the effect of looking at the surface of water and into the water at the same time. White or standard screens do not carry this illusion and work on one plane in front of the viewer. The micro-shadows and details in contrasts are enhanced by the hand tooled irregular surface. This surface quality creates the effect of depth of an interior surface and exterior surface. One sees the gold surface, the imagery projected and shadow world behind the surface.

The gold and layers physically enhance and transmute the perceived colors in the image. The color of the gold with the color of the bole and finally the white gesso, alter the returning colors to the viewer. Reds become intensified, greens saturate, blues deepen and the light colors become iridescent. These colors can be intentionally altered in hue and intensity in the projections. Darker colors fall back in the plane and become saturated and richer. Each screen, on each of layers, will affect the colors.

The above description is applicable to all embodiments described herein.

Figure 2:
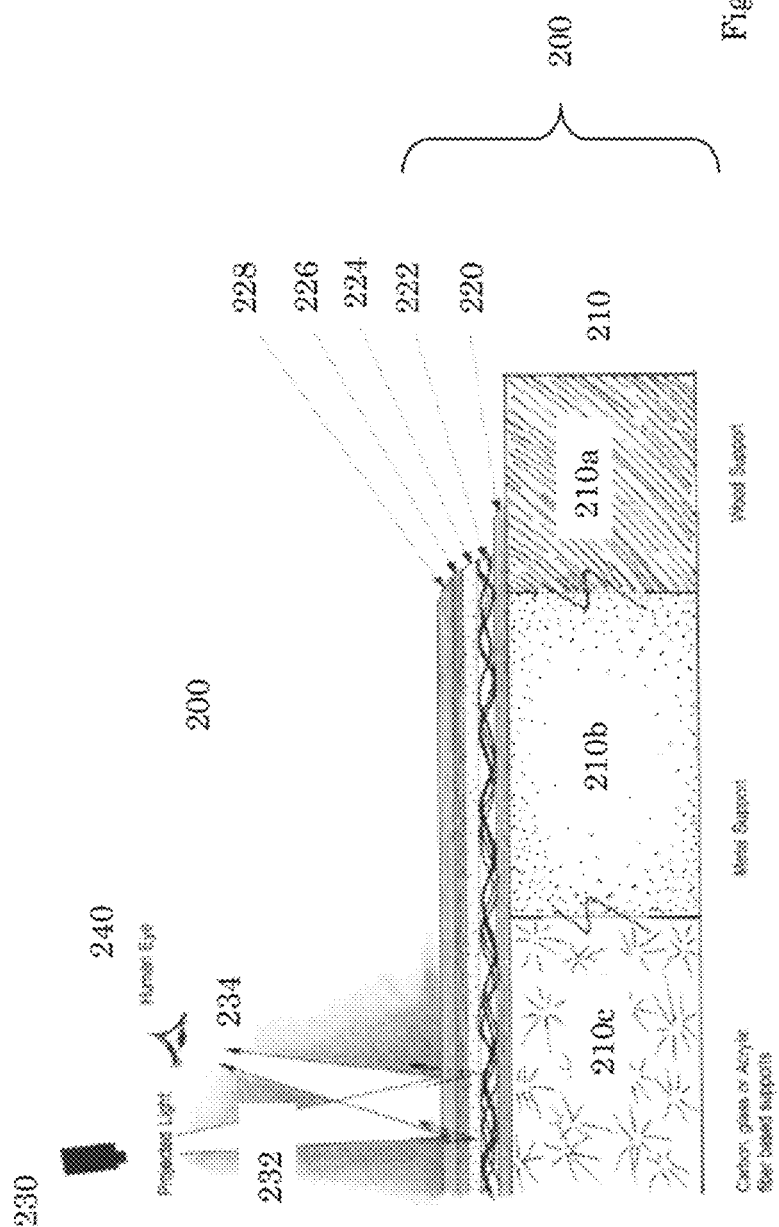
FIG. 2 is another embodiment of a projection screen with metallic coated projection receiving surface.

FIG. 2 is an embodiment of a projection screen 200 with metallic coated projection receiving surface 228. The screen 200 further includes a support 210 which may be, but is not limited to, wood 210a, metal 210b, plastic, fiberglass, carbon 210c, acrylic 210c, glass 210c, a flexible membrane or the like. The support 210 provides the foundation for an adhesive layer 220, a fiber support 222, a chalk and glue layer 224, a clay and glue layer 226 and the metallic coated projection receiving surface 228.

The adhesive layer 220 may be, but is not limited to, glue, varnish, tape and the like. In one embodiment, the adhesive layer is rabbit skin glue. The fiber support or layer 222 may be a cloth support or a membrane. The fiber support or layer 222 is applied and tightly glued to the support 210. The fiber support or layer 222 is used to help stabilize the surface from expanding and contracting in weather cycles, such as temperature, moisture, humidity, and air flow, for example. For example, when applied to wood, the fiber support or layer 222 covers cracks. The fiber support or layer 222 also acts as a cushion for the remaining layers.

The chalk and glue layer 224, (also known as a gesso layer), is a combination of a basic chalk substance such as calcium carbonate, with a glue, such as, for example, rabbit skin glue. The calcium carbonate nominally comes in a fine white powder that can be mixed with the glue. The clay and glue layer 226, (also known as a bole layer), is a final adhesive clay covering the gesso layer 224. The bole layer 226 resembles dark red mud and is mixed with rabbit skin glue. It is painted on in multiple layers. It comes in many earthen colors, for example, red, yellow, brown, grey, black, white, green, and blue clay. This is important because the bole layer 226 shows through the final layer of gold and affects the hue of the projected light. The metallic coated projection receiving surface 228 may be as described herein above.

Described herein is a method for making the projection screen 200. A shape and size for the support 210 is selected and finished as described herein above. The adhesive layer 220 is then applied to the surface of the support 210 in multiple layers as described herein above. The fiber support or layer 222 is applied by laying a layer of glue and bringing the cloth down carefully in contact with the support 210. Any bubbles are pushed out and a firm perfect adherence is achieved.

The gesso layer 224 is then applied in layers. The chalk is mixed with rabbit skin glue at, for example, blood warm temperature, to form the gesso. For example, the temperature may be between 90° F. to 110° F. The gesso is then applied in multiple layers. For example, the number of layers may be around twelve. After the layers are dry, it is sanded to a desired finish. For example, the finish may be rough, medium, fine or polished. In an embodiment, the desired finish is a very fine polish. For example, a 600 grit sandpaper may be used. In another example, a 1200-1600 grit sandpaper may be used to obtain a more perfect sanded surface. The bole layer 226 is then applied in multiple layers. This is sanded fine and polished.

The metallic coated projection receiving surface 228 is then created by applying, for example, gold leaves. The gold, for example, is laid down using a water gilding process. The gold leaves are floated on a thin layer of water. After the water is absorbed and the surface 228 becomes dank, an agate stone is used to crush the gold layer down making it one with the layers above. This is nominally done a few millimeters at a time. In other embodiments, gilding may be implemented through gold plating or an application of a varnish to receive sheets of gold leaf or gold powder. The resulting layer is termed bright gold. This is highly reflective to light, non-tarnishing, and a beautiful gold layer. In an embodiment, a clear sealer is applied over the final gold layer for protection. The clear sealer may be, but is not limited to, lacquer or some other transparent medium.

In this embodiment, a light beam 232 from a projector 230 penetrates the gold layer, interacts with the under layers and then reflects back 234 to the eye 240 as described herein above. The effects on the projected image as described herein above are thus established.

Figure 3:
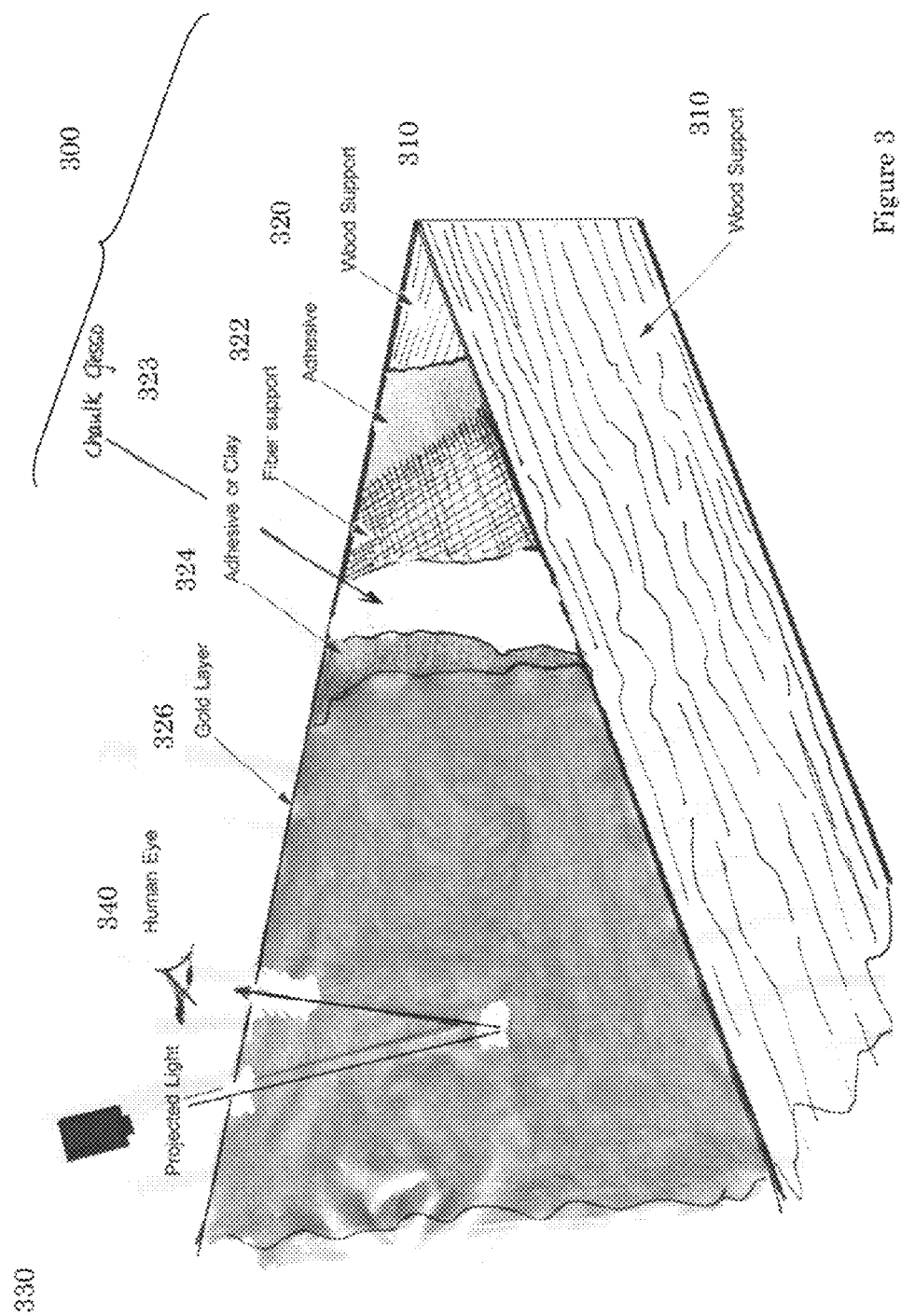
FIG. 3 is another embodiment of a projection screen with metallic coated projection receiving surface.

FIG. 3 is another embodiment of a projection screen 300 with metallic coated projection receiving surface 326. The screen 300 includes a support 310 which is wood. The support 310 provides the foundation for an adhesive layer 320, a fiber support 322, a chalk and glue layer 323, a clay and glue layer 324 and the metallic coated projection receiving surface 326.

The adhesive layer 320 may be, but is not limited to, glue, varnish, tape and the like. In one embodiment, the adhesive layer is rabbit skin glue. The fiber support or layer 322 may be a cloth support or a membrane. The fiber support or layer 322 is applied and tightly glued to the support 310. The fiber support or layer 322 is used to help stabilize the surface from expanding and contracting in weather cycles. For example, when it applied to wood, it covers cracks. The fiber support or layer 322 also acts as a cushion for the remaining layers.

The chalk and glue layer 323, (also known as a gesso layer), is a combination of a basic chalk substance such as calcium carbonate, with a glue, such as, for example, rabbit skin glue. The calcium carbonate nominally comes in a fine white powder that can be mixed with the glue. The clay and glue layer 324, (also known as a bole layer), is the final adhesive clay covering the chalk and glue layer 323. The bole layer 324 resembles dark red mud and is mixed with rabbit skin glue. It is painted on in multiple layers. It comes in many earthen colors, for example, red, brown, grey, black, green, and blue. This is important because the bole layer 324 shows through the final layer of gold and affects the hue of the projected light. The metallic coated projection receiving surface 326 may be as described herein above.

Described herein is a method for making the projection screen 300. A shape and size for the support 310 is selected and finished as described herein above. The adhesive layer 320 is then applied to the surface of the support 310 in multiple layers as described herein above. The fiber support or layer 322 is applied by laying a layer of glue and bringing the cloth down carefully in contact with the support 310. Any bubbles are pushed out and a firm perfect adherence is achieved.

The gesso layer 323 is then applied in layers. The chalk is mixed with rabbit skin glue at, for example, blood warm temperature, to form the gesso. For example, the temperature may be between 90° F. to 110° F. The gesso is then applied in multiple layers. For example, the number of layers may be around twelve. After the layers are dry, it is sanded to a desired finish. For example, the finish may be rough, medium, fine or polished. In an embodiment, the desired finish is a very fine polish. For example, a 600 grit sandpaper may be used. In another example, a 1200-1600 grit sandpaper may be used to obtain a more perfect sanded surface. The bole layer 324 is then applied in multiple layers as described herein above. The metallic coated projection receiving surface 326 is then applied as described herein above. In an embodiment, a clear sealer may be applied as described herein above.

In this embodiment, a light beam 332 from a projector 330 penetrates the gold layer, interacts with the under layers as described herein and then reflects back 334 to the eye 340. The effects on the projected image as described herein above are thus established.

FIG. 4 is another embodiment of a projection screen 400 with metallic coated projection receiving surface 428. The screen 400 further includes a support 410 which is, for example, wood. The support 410 provides the foundation for a foam support 415, an adhesive layer 420, a fiber support 422, a chalk and glue layer 424, a clay and glue layer 426 and the metallic coated projection receiving surface 428.

The foam support 415 may be a polystyrene support that provides rigidity to the wood support 410. The adhesive layer 420 may be, but is not limited to, glue, varnish, tape and the like. In one embodiment, the adhesive layer is rabbit skin glue. The fiber support or layer 422 may be a cloth support or a membrane. The fiber support or layer 422 is applied and tightly glued to the support 410. The fiber support or layer 422 is used to help stabilize the surface from expanding and contracting in weather cycles. For example, when it applied to wood, it covers cracks. The fiber support or layer 422 also acts as a cushion for the remaining layers.

The chalk and glue layer 424, (also known as a gesso layer), is a combination of a basic chalk substance such as calcium carbonate, with a glue, such as, for example, rabbit skin glue. The calcium carbonate nominally comes in a fine white powder that can be mixed with the glue. The clay and glue layer 426, (also known as a bole layer), is the final adhesive clay covering the gesso layer 424. The bole layer 426 resembles dark red mud and is mixed with rabbit skin glue. It is painted on in multiple layers. It comes in many earthen colors, for example, red, brown, grey, black, green, and blue. This is important because the bole layer 426 shows through the final layer of gold and affects the hue of the projected light. The metallic coated projection receiving surface 428 may be as described herein above.

Described herein is a method for making the projection screen 400. A shape and size for the support 410 is selected and finished as described herein above. The adhesive layer 420 is then applied to the surface of the support 410 in multiple layers as described herein above. The fiber support or layer 422 is applied by laying a layer of glue and bringing the cloth down carefully in contact with the support 410. Any bubbles are pushed out and a firm perfect adherence is achieved.

The gesso layer 424 is then applied in layers. The chalk is mixed with rabbit skin glue at, for example, blood warm temperature, to form the gesso. For example, the temperature may be between 90° F. to 110° F. The gesso is then applied in multiple layers. For example, the number of layers may be around twelve. After the layers are dry, it is sanded to a desired finish. For example, the finish may be rough, medium, fine or polished. In an embodiment, the desired finish is a very fine polish. For example, a 600 grit sandpaper may be used. In another example, a 1200 grit sandpaper may be used to obtain a perfect surface. The bole layer 426 is then applied in multiple layers. This is sanded fine and polished. The metallic coated projection receiving surface 428 is then applied as described herein above. In an embodiment, a clear sealer may be applied as described herein above.

In this embodiment, a light beam 432 from a projector 430 penetrates the gold layer, interacts with the under layers and then reflects back 434 to the eye 440. The effects on the projected image as described herein above are thus established.

Figures 5A, 5B:
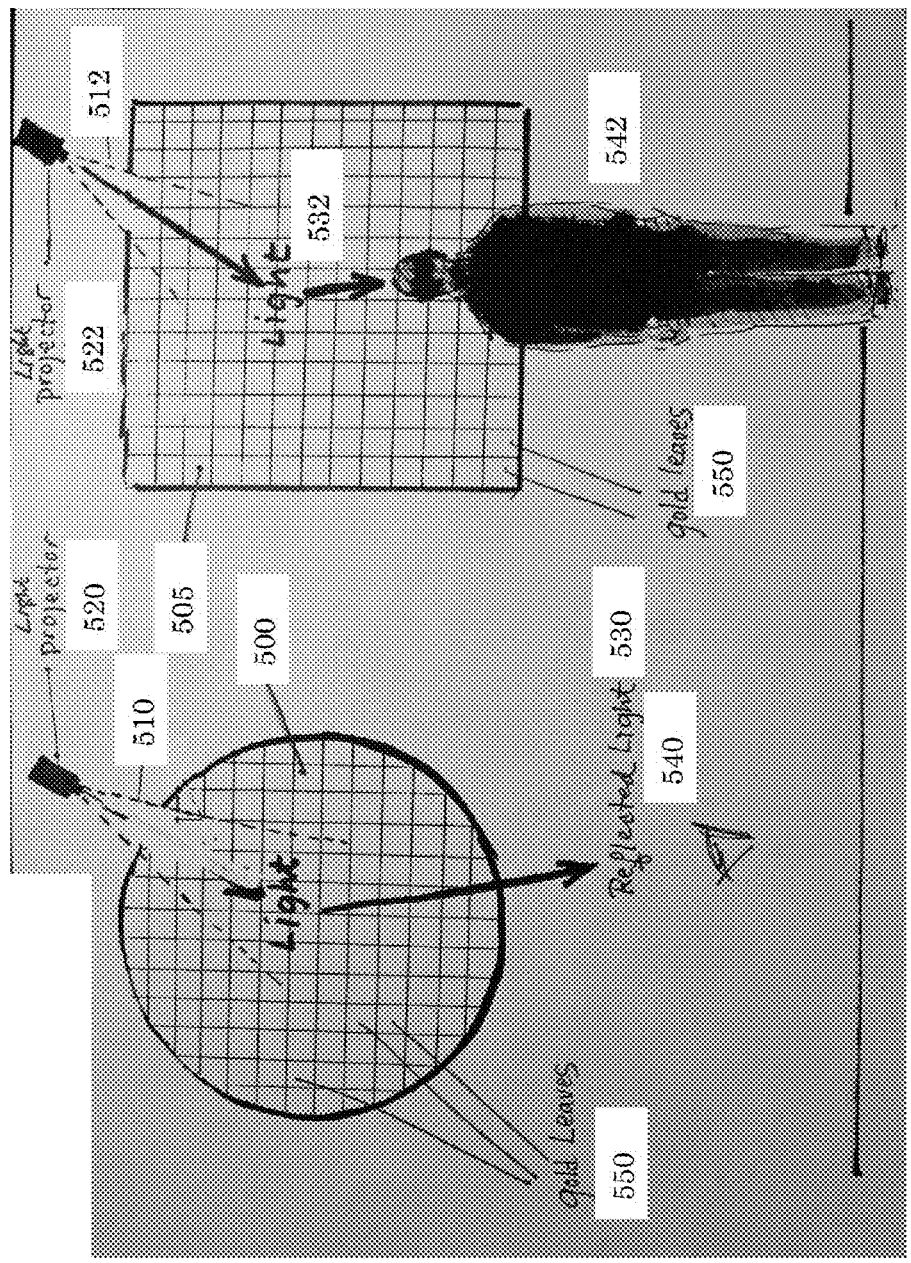
FIGS. 5A and 5B show an embodiment of a disk shaped projection screen with metallic coated projection receiving surface and a rectilinear screen with metallic coated projection receiving surface in wall mounted configurations.
Figure 6:
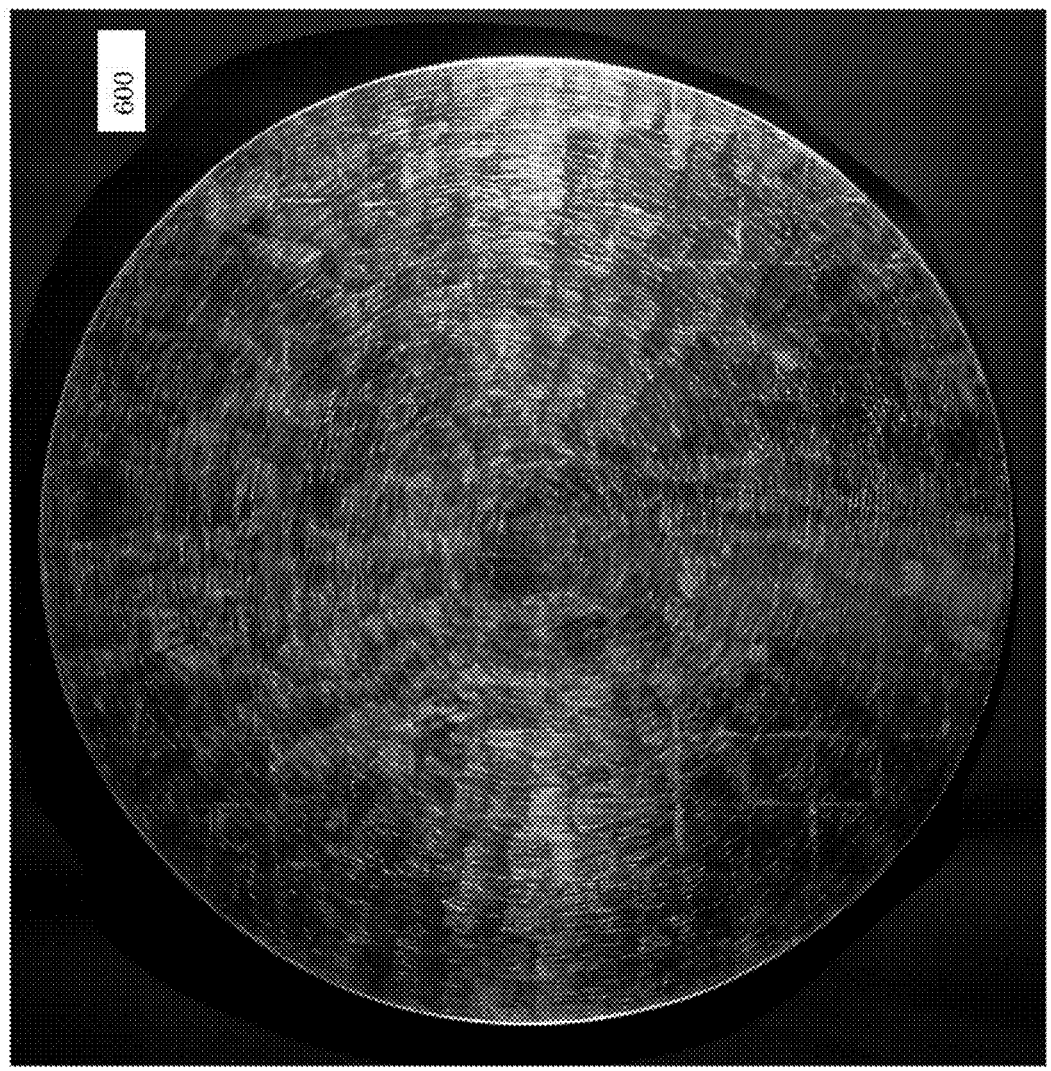
FIG. 6 is a picture of an embodiment of a disk shaped projection screen with metallic coated projection receiving surface.

FIGS. 5A and 5B show an embodiment of a disk shaped projection screen with metallic coated projection receiving surface 500 and a rectilinear projection screen with metallic coated projection receiving surface 505 in a wall mounted or ceiling suspended configuration. The disk shaped projection screen with metallic coated projection receiving surface 500 and the rectilinear projection screen with metallic coated projection receiving surface 505 are prepared as described herein above on a human scale configuration. In this embodiment, the disk shaped projection screen with metallic coated projection receiving surface 500 and the rectilinear projection screen with metallic coated projection receiving surface 505 receive projected light 510 and 512 from multiple ceiling or wall-mounted projectors 520 and 522, respectively, and reflect the light 530 and 532, respectively, into a viewers vision 540 and 542, respectively. In this embodiment, the gold surface is comprised of gold leaves 550. FIG. 6 is a picture of an embodiment of a disk shaped projection screen with metallic coated projection receiving surface 600.

FIGS. 7A-7D show an embodiment of a circular projection screen 700 with metallic coated projection receiving surface with different surface topologies. FIG. 7B shows an embodiment of screen 700 of FIG. 7A with a flat surface 705. FIG. 7C shows an embodiment of screen 700 of FIG. 7A with a convex surface 710. FIG. 7D shows an embodiment of screen 700 of FIG. 7A with a concave surface 715.

FIGS. 8A-8D show an embodiment of a rectilinear projection screen 800 with metallic coated projection receiving surface with different surface topologies. FIG. 8B shows an embodiment of screen 800 of FIG. 8A with a flat surface 805. FIG. 8C shows an embodiment of screen 800 of FIG. 8A with a convex surface 810. FIG. 8D shows an embodiment of screen 800 of FIG. 8A with a concave surface 815.

The embodiments described herein use a disk shaped or rectilinear projection screen for purposes of illustration only. Other shapes may be used using the methods and configurations described herein.

FIG. 9 shows an embodiment of a disk shaped projection screen 900 with metallic coated projection receiving surface in a wall mounted configuration. The screen 900 is prepared as described herein and mounted on a wall 902 to receive projected light 905 originating from a ceiling mounted light projector 910. The screen 900 reflects the light 915 towards a viewer 920.

FIG. 10 shows an embodiment of a rectilinear projection screen 1000 with metallic coated projection receiving surface in a wall mounted configuration. The screen 1000 is prepared as described herein and mounted on a wall 1002 to receive projected light 1005 originating from a ceiling mounted light projector 1010. The screen 1000 reflects the light 1015 towards a viewer 1020.

FIG. 11 shows an embodiment of a disk shaped projection screen 1100 with metallic coated projection receiving surface in a vertical suspended configuration. The screen 1100 is prepared as described herein and suspended from a ceiling 1102 to receive projected light 1105 originating from a ceiling mounted light projector 1110. The screen 1100 reflects the light 1115 towards a viewer 1120.

FIG. 12 shows an embodiment of a disk shaped projection screen 1200 with metallic coated projection receiving surface in a floor mounted or positioned configuration. The screen 1200 is prepared as described herein and mounted or positioned on a floor 1202 to receive projected light 1205 originating from a ceiling mounted light projector 1210. The screen 1200 reflects the light 1215 towards a viewer 1220.

FIG. 13 shows an embodiment of a disk shaped projection screen 1300 with metallic coated projection receiving surface in a horizontal suspended configuration. The screen 1300 is prepared as described herein and mounted on a ceiling 1302, (using suspension cables 1303), to receive projected light 1305 originating from a floor mounted light projector 1310, (i.e. on pedestal 1311). The screen 1300 reflects the light 1315 towards a viewer 1320.

FIG. 14 shows an embodiment of a rectilinear convex projection screen 1400 with metallic coated projection receiving surface in a wall mounted configuration. The screen 1400 is prepared as described herein and mounted on a wall 1402 to receive projected light 1405 originating from a ceiling mounted light projector 1410. The screen 1400 reflects the light 1415 towards a viewer 1420.

FIG. 15 shows an embodiment of a large scale disk shaped convex projection screen 1500 with metallic coated projection receiving surface in a wall mounted configuration. The screen 1500 is prepared as described herein and mounted on a wall 1502 to receive projected light 1505 originating from a ceiling mounted light projector 1510. The screen 1500 reflects the light 1515 towards multiple viewers 1520.

Figure 16:
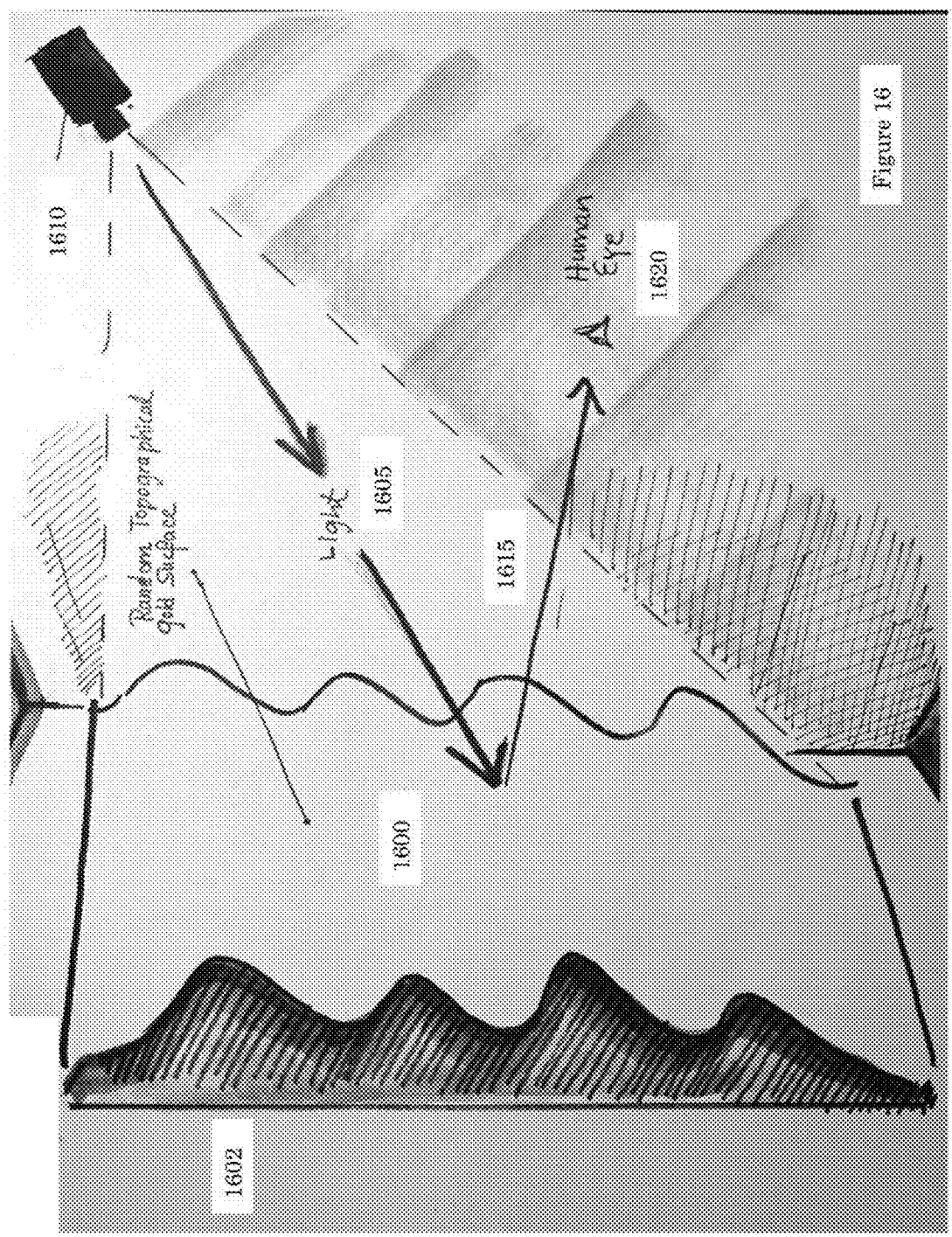
FIG. 16 shows an embodiment of a rectilinear concave and convex projection screen with metallic coated projection receiving surface in a wall mounted configuration.

FIG. 16 shows an embodiment of a rectilinear concave and convex projection screen 1600 with metallic coated projection receiving surface in a wall mounted configuration. The screen 1600 is prepared as described herein and mounted on a wall 1602 to receive projected light 1605 originating from a ceiling mounted light projector 1610. The screen 1600 reflects the light 1615 towards a viewer 1620.

Figure 17:
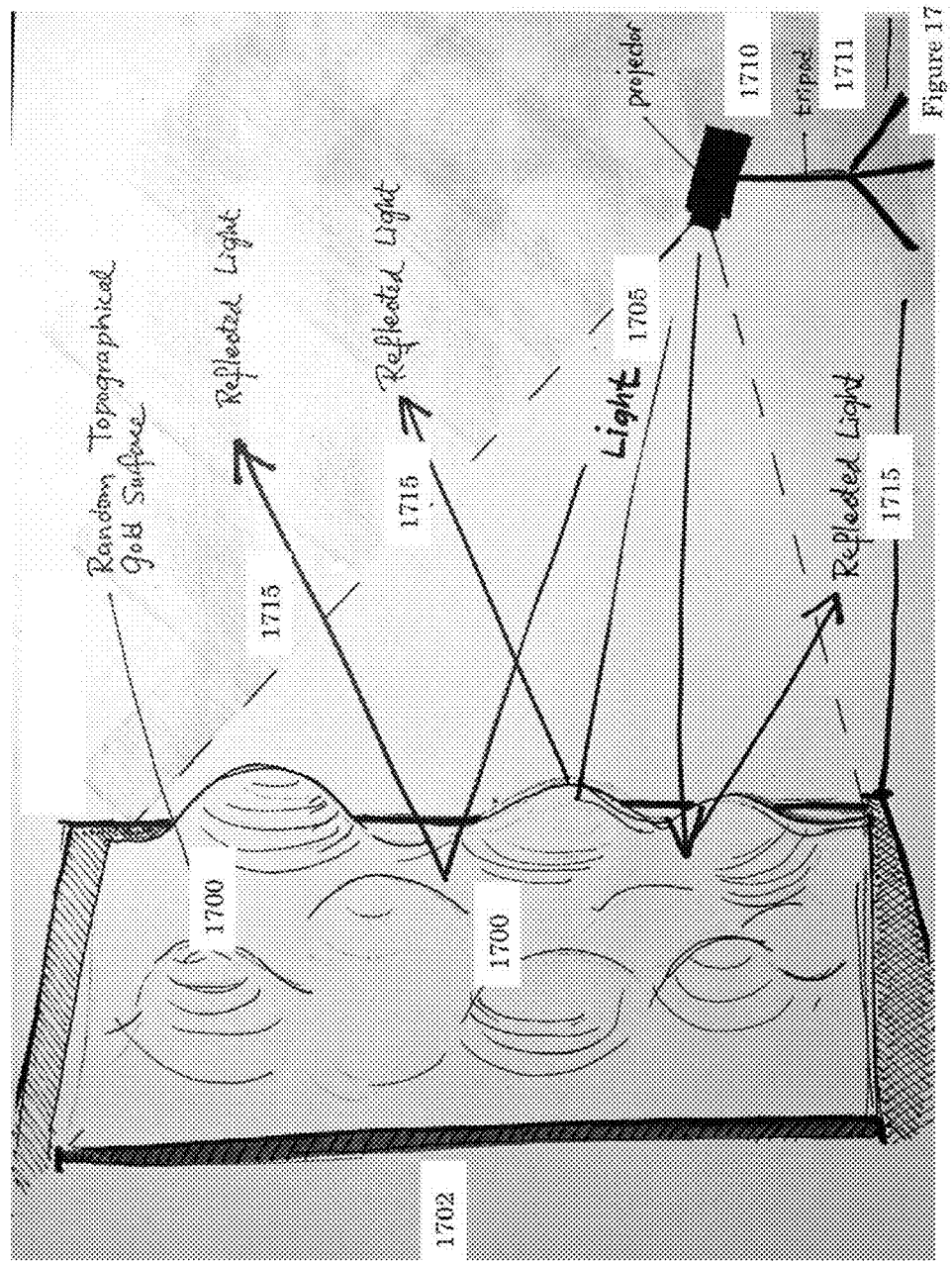
FIG. 17 shows another embodiment of a rectilinear concave and convex projection screen with metallic coated projection receiving surface in a wall mounted configuration.

FIG. 17 shows another embodiment of a rectilinear concave and convex projector screen 1700 with metallic coated projection receiving surface in a wall mounted configuration. The screen 1700 is prepared as described herein and mounted on a wall 1702 to receive projected light 1705 originating from a floor mounted light projector 1710, (sitting on a pedestal 1711). The screen 1700 reflects the light 1715 in multiple directions.

Figure 18:
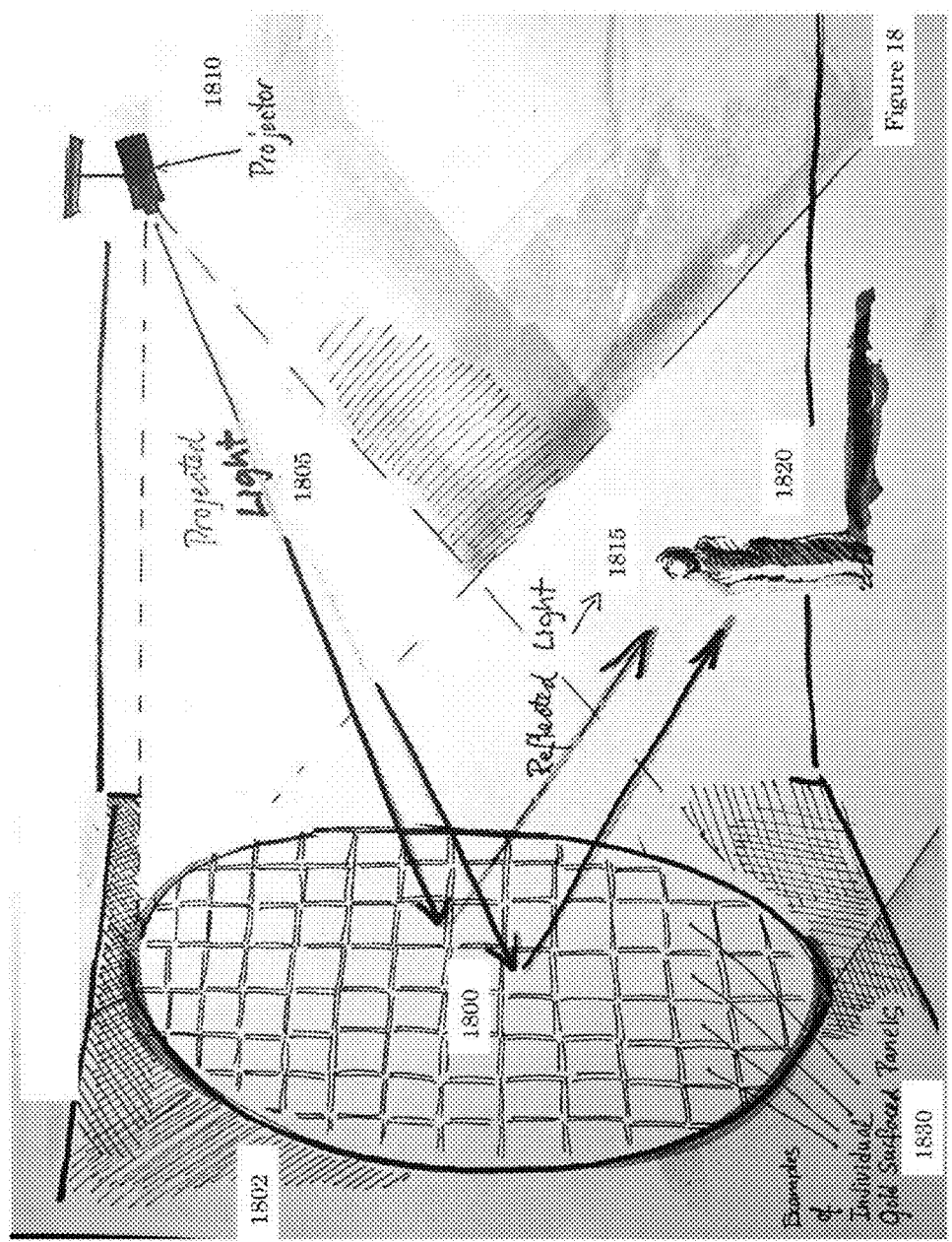
FIG. 18 shows an embodiment of a disk shaped projection screen with metallic coated projection receiving surface with multiple panels in a wall mounted configuration.

FIG. 18 shows an embodiment of a disk shaped projection screen 1800 with metallic coated projection receiving surface with multiple panels 1830 in a wall mounted configuration. The screen 1800 is prepared as described herein and mounted on a wall 1802 to receive projected light 1805 originating from a ceiling mounted light projector 1810. The screen 1800 reflects the light 1815 towards a viewer 1820.

Figure 19:
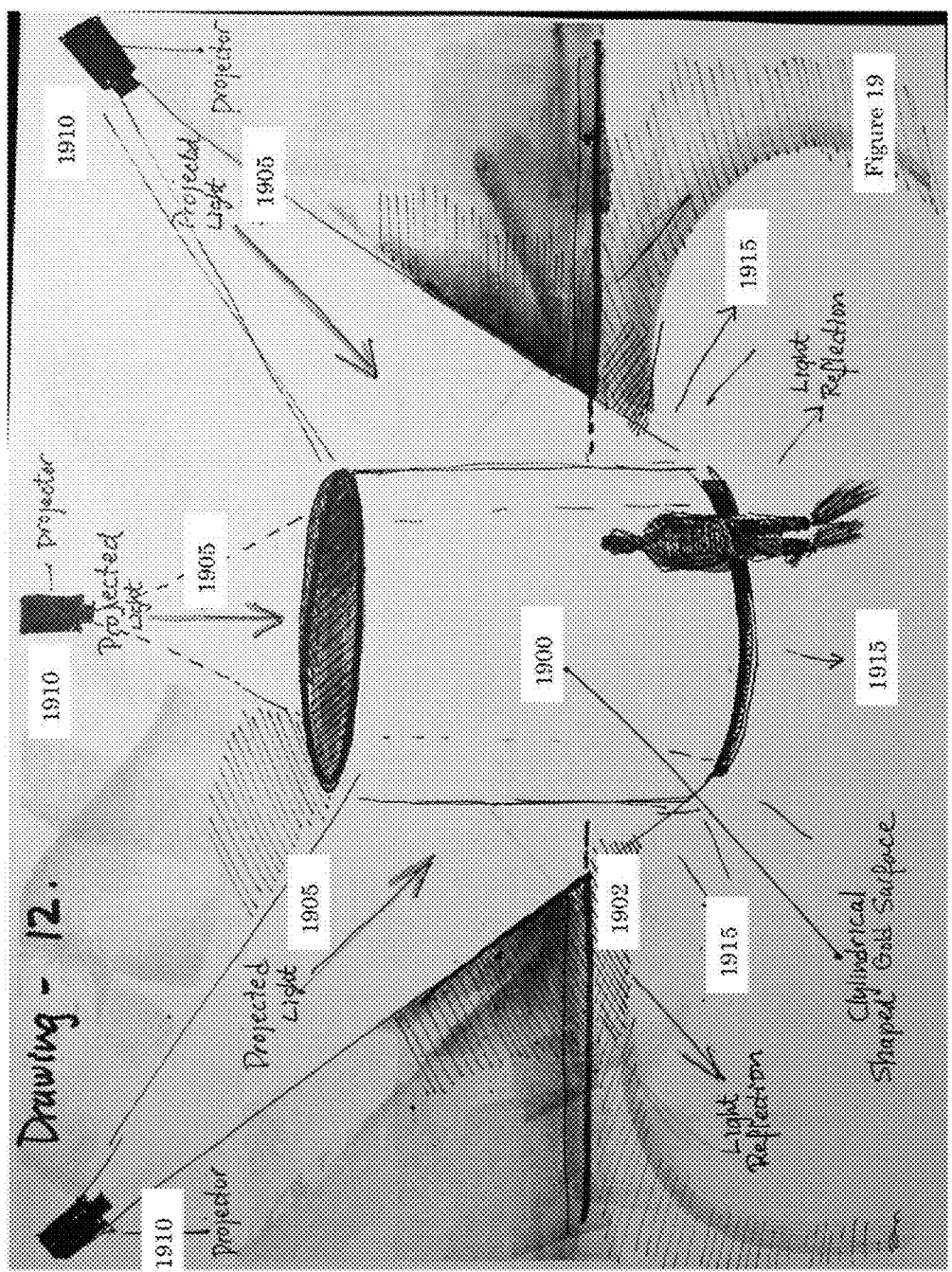
FIG. 19 shows an embodiment of a cylinder shaped projection screen with metallic coated projection receiving surface in a floor mounted configuration.

FIG. 19 shows an embodiment of a cylinder shaped projection screen 1900 with metallic coated projection receiving surface in a floor mounted configuration. The screen 1900 is prepared as described herein and mounted or positioned on a floor 1902 to receive projected light 1905 originating from multiple ceiling mounted light projectors 1910. The screen 1900 reflects the light 1915 in multiple directions 1920.

Figure 20:
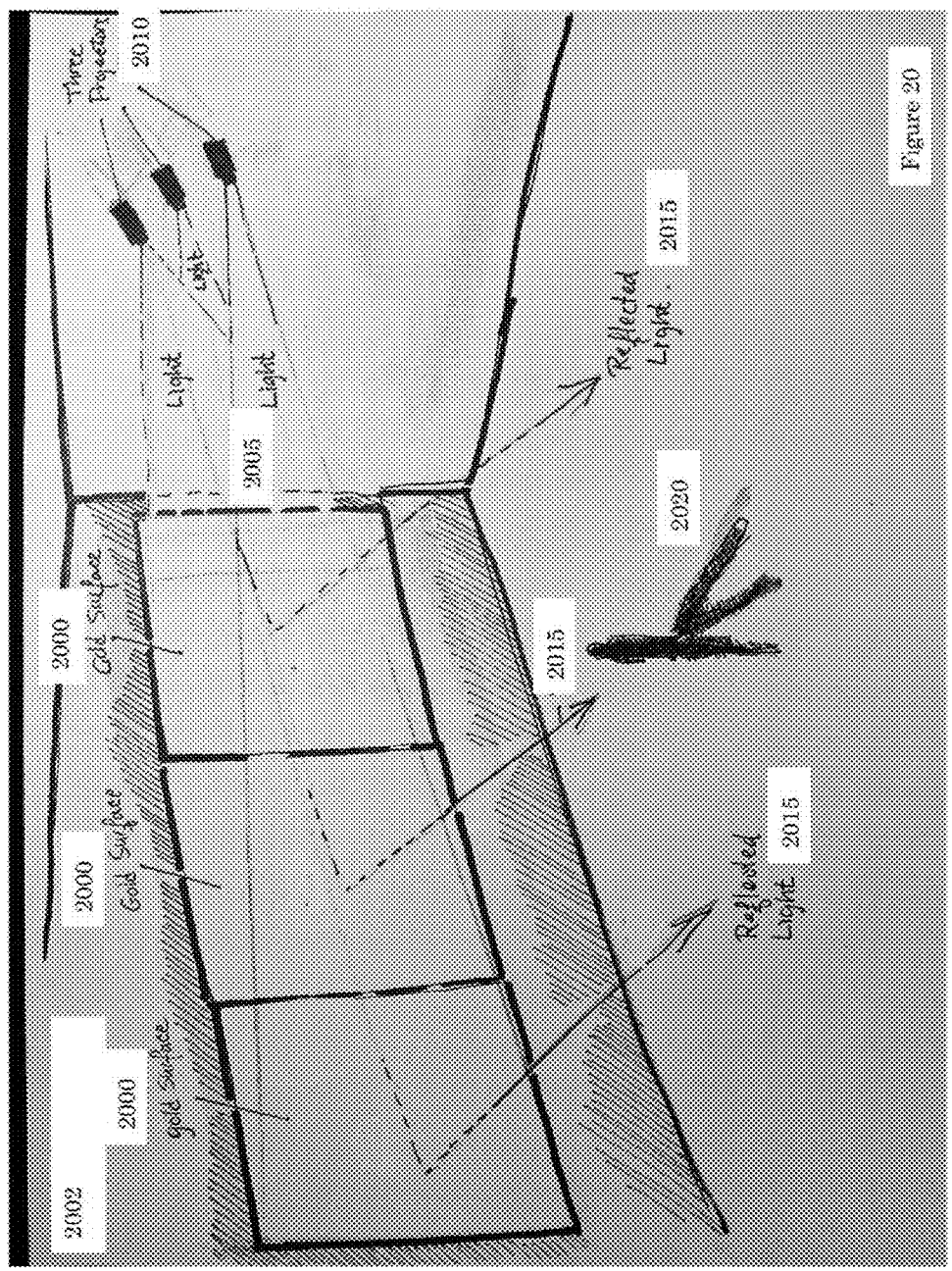
FIG. 20 shows an embodiment of multiple rectilinear projection screen with metallic coated projection receiving surfaces with multiple projectors in a wall mounted configuration.

FIG. 20 shows an embodiment of multiple rectilinear projector screens 2000 each with metallic coated projection receiving surfaces with multiple projectors in a wall mounted configuration. The screens 2000 are prepared as described herein and mounted on a wall 2002 to receive projected light 2005 originating from ceiling mounted light projectors 2010. The screen 2000 reflects the light 2015 towards a respective viewer 2020.

FIG. 21 shows an embodiment of a sphere shaped projector screen 2100 with metallic coated projection receiving surface in a floor mounted configuration. The screen 2100 is prepared as described herein and mounted or positioned on a floor 2102 to receive projected light 2105 originating from ceiling mounted light projectors 2110. The screen 2100 reflects the light 2115 towards viewers 2120.

In summary, a projection screen may be prepared as described herein. The projection screen may be a circular shape, a rectilinear shape, a cylindrical shape, a globe-like shape or the like. The surface of the projection screen may have a convex exterior shape, a concave shape, a flat shape, or a convex and concave shape. The projection screen may be mounted or positioned on a vertical wall, on a floor, or on a ceiling. The projection screen may be any size. The projector may comprise one or multiple projectors. The projector may be ceiling mounted, wall mounted, or floor mounted. The above combinations and configurations show possible embodiments and are not intended to limit the scope of the projection screen described herein.

As described herein, the methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the metallic coated projection receiving surface and configurations for use thereof described herein, and are considered to be within the full scope of the invention.

Although features and elements are described above in particular combinations, each feature or element can be used alone without the other features and elements or in various combinations with or without other features and elements.

What is claimed is:

1. A projection screen with a gold coated projection receiving surface for reflecting light, consisting of:
    a support structure;
    an adhesive layer on top of the support structure;
    a fiber support glued to the support structure using the adhesive layer;
    at least one chalk and adhesive layer applied on to the fiber support;
    at least one clay and adhesive layer applied on to the at least one chalk and glue adhesive; and
    at least one gold layer applied to the at least one clay and glue adhesive layer to form the gold coated projection receiving surface, wherein at least a portion of light that is projected onto the gold coated projection surface passes through ones of at least the at least one gold layer, the at least one clay and adhesive layer, the at least one chalk and adhesive layer and wherein the projection screen reflects back a lustrous, iridescent image that has motion and depth qualities with transmuted color characteristics.

2. The projection screen of claim 1, wherein the adhesive layer is at least one of glue, varnish, and tape.

3. The projection screen of claim 1, wherein the support structure is at least one of wood, metal, plastic, fiberglass, carbon, acrylic, glass, and a flexible membrane.

4. The projection screen of claim 1, wherein the fiber support is one of cloth or membrane.

5. The projection screen of claim 1, wherein the at least one clay and adhesive layer includes at least one of red, yellow, brown, grey, black, white, green, and blue clay.

6. The projection screen of claim 1, wherein the gold coated projection receiving surface has at least one of a concave, convex and flat topology.

7. A method for making a projection screen with a gold coated projection receiving surface for reflecting light, consisting of:
   providing a support structure having a predetermined surface topology;
   adhering a fiber support to the support structure;
   constructing a multilayered gesso layer on to the fiber support;
   constructing a multilayered bole layer applied on to the multilayered gesso layer; and
   constructing a gold layer on to the multilayered bole layer to form the gold coated projection receiving surface,
   wherein at least a portion of light that is projected onto the gold coated projection receiving surface passes through ones of at least the at least one gold layer, the at least one clay and adhesive layer, the at least one chalk and adhesive layer and wherein the projection screen reflects back a lustrous, iridescent image that has motion and depth qualities with transmuted color characteristics.

8. The method of claim 7, wherein the constructing a multilayered gesso layer includes:
   mixing a chalk and adhesive to form a gesso in a predetermined temperature range;
   applying multiple layers of the gesso; and
   sanding the multiple layers to a desired finish when the multiple layers are dry.

9. The method of claim 8, wherein the constructing a multilayered bole layer includes:
   mixing a clay and adhesive to form a bole;
   applying multiple layers of the bole; and
   sanding the multiple layers to a desired finish.

10. The method of claim 9, wherein the support structure is at least one of wood, metal, plastic, fiberglass, carbon, acrylic, glass, and a flexible membrane.

11. The method of claim 10, wherein the constructing a gold layer includes:
   laying down gold leaves on to a thin layer of water; and
   crushing the gold leaves and making it one with layers above, wherein the layers above are at least the multilayered bole layer, and the multilayered gesso layer.

12. The method of claim 11, wherein the multilayered bole layer includes at least one of red, yellow, brown, grey, black, white, green, and blue clay.

13. The method of claim 12, wherein the gold coated projection receiving surface has at least one of a concave, convex and flat topology.

14. A projection screen with a gold coated projection receiving surface for reflecting light prepared by a method consisting of the steps of:
   providing a support structure having a predetermined surface topology;
   adhering a fiber support to the support structure;
   constructing a multilayered gesso layer on to the fiber support;
   constructing a multilayered bole layer applied on to the multilayered gesso layer; and
   constructing a gold layer on to the multilayered bole layer to form the gold coated projection receiving surface,
   wherein at least a portion of light that is projected onto the gold coated projection receiving surface passes through ones of at least the at least one gold layer, the at least one clay and adhesive layer, the at least one chalk and adhesive layer and wherein the projection screen reflects back a lustrous, iridescent image that has motion and depth qualities with transmuted color characteristics.

15. The projection screen of claim 14, wherein the constructing a multilayered gesso layer includes:
   mixing a chalk and adhesive to form a gesso in a predetermined temperature range;
   applying multiple layers of the gesso; and
   sanding the multiple layers to a desired finish when the multiple layers are dry.

16. The projection screen of claim 15, wherein the constructing a multilayered bole layer includes:
   mixing a clay and adhesive to form a bole;
   applying multiple layers of the bole; and
   sanding the multiple layers to a desired finish.

17. The projection screen of claim 15, wherein the gold coated projection receiving surface has at least one of a concave, convex and flat topology.

18. The projection screen of claim 15, wherein the constructing a gold layer includes:
   laying down gold leaves on to a thin layer of water; and
   crushing the gold leaves and making it one with layers above, wherein the layers above are at least the multilayered bole layer, and the multilayered gesso layer.

19. A method for making gold projections using a projection screen with a gold coated projection receiving surface for reflecting an incident light corresponding to content, consisting of:
   providing a support structure having a predetermined surface topology;
   adhering a fiber support to the support structure;
   constructing a multilayered gesso layer on to the fiber support;
   constructing a multilayered bole layer applied on to the multilayered gesso layer;
   constructing a gold layer on to the multilayered bole layer to form the gold coated projection receiving surface,
   wherein at least a portion of light that is projected onto the gold coated projection receiving surface passes through ones of at least the at least one gold layer, the at least one clay and adhesive layer, the at least one chalk and adhesive layer and wherein the projection screen reflects back a lustrous, iridescent image that has motion and depth qualities with transmuted color characteristics;
   monitoring the image; and
   editing the content for color correction.

* * * * *